(12) United States Patent
Zhang et al.

(10) Patent No.: US 7,604,718 B2
(45) Date of Patent: Oct. 20, 2009

(54) DYNAMICALLY CONFIGURABLE ELECTRODE FORMED OF PIXELS

(75) Inventors: Yi Zhang, Hillsboro, NJ (US); Michael Seul, Fanwood, NJ (US)

(73) Assignee: BioArray Solutions Ltd., Warren, NJ (US)

( * ) Notice: Subject to any disclaimer, the term of this patent is extended or adjusted under 35 U.S.C. 154(b) by 1031 days.

(21) Appl. No.: 10/778,520

(22) Filed: Feb. 14, 2004

(65) Prior Publication Data

US 2004/0159546 A1 Aug. 19, 2004

Related U.S. Application Data

(60) Provisional application No. 60/448,706, filed on Feb. 19, 2003.

(51) Int. Cl.
 *B03C 5/00* (2006.01)
(52) U.S. Cl. .............. 204/230.6; 204/230.8; 204/643; 204/547; 204/267; 204/229.5; 204/600; 204/450; 204/403.01
(58) Field of Classification Search ............ 204/403.01, 204/400, 547, 643, 267, 229.4, 229.5, 600, 204/450, 230.6, 230.8
See application file for complete search history.

(56) References Cited

U.S. PATENT DOCUMENTS

| 6,149,789 A * | 11/2000 | Benecke et al. ............. 204/547 |
| 6,251,595 B1 * | 6/2001 | Gordon et al. ................ 506/40 |
| 6,355,491 B1 | 3/2002 | Zhou et al. |
| 2002/0125138 A1 * | 9/2002 | Medoro ...................... 204/547 |

OTHER PUBLICATIONS

Jones et al., "Dielectrophoretic liquid actuation and nanodroplet formation", Journal of Applied Physics, vol. 89, No. 2, Jan. 15, 2001, pp. 1441-1448.*

* cited by examiner

*Primary Examiner*—Nam X Nguyen
*Assistant Examiner*—J. Christopher Ball
(74) *Attorney, Agent, or Firm*—Eric P. Mirabel

(57) ABSTRACT

A dynamically configurable electrode includes a first planar electrode and a planar array of pixels in a different plane, wherein a polarizable liquid medium (including electrolyte solutions) is to reside in the gap between electrodes. The pixels are individually addressable by a time-varying voltage, and adjacent pixels receive, at any instant in time, either the same voltage waveform or a different voltage waveform. Adjacent pixels receiving different voltage waveforms generate corresponding movement of dipolar entities, including dipolar particles, ions, or dipolar molecules in the polarizable liquid medium between the electrodes, which can in turn generate fluid flow and movement of particles suspended in the fluid along the planar array surface.

11 Claims, 25 Drawing Sheets

DYNAMICALLY CONFIGURABLE ELECTRODE FORMED OF PIXELS

RELATED APPLICATIONS

This application claims priority to U.S. Provisional Application Ser. No. 60/448,706, filed Feb. 19, 2003.

BACKGROUND

U.S. Pat. Nos. 6,468,811 and 6,387,707 (incorporated herein by reference) disclose a system providing for a novel type of electrokinetic transport of particles suspended in a polarizable liquid medium. The particles, suspended in the medium, are placed into the gap between two essentially planar electrodes, which lie in different planes. An AC voltage (rather than a DC voltage, as in electrophoresis) is applied across the fluid gap between the two electrodes in contact with the electrolyte solution to induce fluid flow and particle transport. Near the active electrode—defined as that connected to an external AC (and optionally superimposed DC voltage), with the counterelectrode grounded—fluid flow and particle transport are directed along the induced electric field, i.e., parallel to the electrode surface. The mode of transport is not electrophoresis or dielectrophoresis.

By way of either illuminating the active planar electrode composed of suitable material or, alternatively, by selectively chemically patterning the electrode, regions of higher and lower impedance can be defined on the electrode, for example by reducing the impedance in the illuminated or patterned portion(s) of the electrode, and, in the presence of a low frequency applied AC electric field, induce movement of particles into the illuminated (or patterned) areas. See U.S. Pat. No. 6,468,811. Patterning can be accomplished using chemical or other means, for example in order to produce dielectric layers of differing thickness on the active electrode. Selective patterning by optical or chemical means provide the means to define a variety of configurations of particle assembled on the electrode surface in accordance with the patterns, move particles in or out of these configurations, or, in the case of optical patterning, reconfigure these configurations as desired, thereby providing the ability to assemble or disassemble and to reconfigure arrays of particles. International Application Publication No. WO/0120593, entitled "SYSTEM AND METHOD FOR PROGRAMMABLE ILLUMINATION PATTERN GENERATION" discloses a system for programmable control of the electrokinetic movement of particles described above. In this system, electric field-induced assembly of planar particle arrays at an interface between an electrode and an electrolyte solution is again employed, as is the modulation of the impedance of the electrolyte-insulator-semiconductor structure by UV light. In addition, this system employs a control system and user interface to permit the real-time, interactive control over the electrode areas illuminated, to thereby generate, selectively, areas of modified impedance. Spatially and temporally varying the illumination pattern on the lower electrode provides real time control over the movement of suspended particles. International Application Publication No. WO 02076585, entitled "ANALYSIS AND FRACTIONATION OF PARTICLES NEAR SURFACES," discloses a system to further fine-tune movement of suspended particles. In this system, a mixture of particles can be fractionated according to their relaxation frequencies, which in turn reflect differences in size, surface composition or other properties of the particles. Particles with relaxation frequencies greater than that of the applied voltage will be separated from others in the mixture and transported by electrohydrodynamic forces generated in response to the applied electric field.

In all of the foregoing systems, particle movement is used to assemble and disassemble arrays related to a variety of bioanalytical assays. In particular, the inventors discuss assembly and disassembly of arrays of beads bound to oligonucleotides or other biological materials, and arrays of cells. The ability to form, assemble, hold, separate and disassemble arrays selectively, as well as to separate particular beads from the arrays, provides a number of advantages in assay procedures, as more fully explained in the patents and references set forth above.

When using illumination to vary the impedance, one must apply a relatively large voltage (typically about 6 Vpp) across the electrodes to induce a sufficiently large ionic flow to move the particles. When using such voltages, depending on the doping concentration and the illumination level, the semiconductor surface may be forced into strong accumulation or inversion thereby forming conduction channels on the surface, which in turn facilitate lateral drifting of the photo-generated carriers residing in the illuminated region. As a result, the electric field gradient at the edges of the illuminated regions is lowered, making the edges of the pattern of particles one is seeking to form by illumination "blurred" and less distinct. Stronger illumination was observed to enhance the ionic flow. However, the level of illumination has an upper limit, over which the effective regions for particle assembly are widened and the edges become less distinct. A lightly doped surface layer may have the advantage of enhanced carrier generation due to its reduced density of carrier recombination sites. However, this also has a disadvantage, in that, with the depth of the surface layer transiently exceeding the narrowed surface depletion width under positive bias, the lateral diffusion of photo-generated carriers can be enhanced in the substrate which can be collected by the space charge region in the surrounding dark regions at surface, thereby effectively lowering the surface-voltage contrast between the illuminated and the dark regions. Again, as with the effect of large voltages described above, this will effectively widen the regions of lowered impedance about the illuminated regions and make the voltage difference and transition edge between the light and dark regions less distinct. Consequently, the magnitude of induced ionic flow and low-frequency dielectrophoretic forces under the influence of the gradient $\nabla(E.E)$ acting upon the particles are limited. The minority carrier recombination lifetime is an inherent property of the material, and cannot be substantially altered by illumination at levels of interest.

Thus, a system in which there is direct (or improved) control over the spatial location and resolution of the voltage drop to provide a more defined and configurable electric field gradient would be advantageous. In addition, if the effect of interfacial impedance modulation is achieved by an active voltage applied directly at the electrolyte/insulator interface, voltages applied across the fluid gap generally may be lower than those required to generate the same field gradient when using illumination (as described in U.S. Pat. Nos. 6,468,811 and 6,387,707). In the illumination-based systems described above, the AC voltage is applied across the entirety of the planar upper and lower electrodes, and one can only apply a single frequency to the entire structure at any point in time. In contrast, if the frequency of the AC potential is spatially programmable in different locations across the substrate surface, particles or other materials can be separated into different areas of the substrate based on their relaxation frequencies. See, e.g., International Application Publication Nos. 01/20593 and 02/076585.

While illumination provides a flexible and adaptable method to achieve dynamic reconfigurability and hence optically programmable fluid flow and particle transport, this method readily applies only to those regions of an electrode permitting optical access. In certain configurations and applications, it will be desirable to exert control over a larger portion of an electrode than that accessible optically. It thus will be desirable to provide methods and compositions permitting dynamic reconfigurability and programmable transport and assembly of fluids and particles in a manner not requiring illumination.

One possible system to directly generate electric field gradients would be an array of microelectrodes capable of generating desired configurations of electric fields on activation, arrayed on a substrate and underlying the particle/electrolyte suspension. Selective activation could be used to control particle movement in the same manner as accomplished by UV illumination or chemical patterning of the insulating layer. One problem would be providing a chemically and electrically uniform array surface, which would not itself generate spatial modulation in the electrolyte other than those desired. In addition, construction would be difficult as each electrode would need to be individually connected to a control circuit or multiplexed.

Thus, what is needed is a practical and effective system to provide the same degree of spatial control over electric field generation as can be achieved with known systems involving illumination of a substrate surface or surface patterning, preferably in the form of an integrated microelectronic device permitting inexpensive mass production.

SUMMARY

A dynamically configurable electrode includes a first planar electrode and a planar array of pixels in a different plane, wherein a polarizable liquid medium (including electrolyte solutions) is to reside in the gap between electrodes. The pixels are individually addressable by a time-varying voltage, and adjacent pixels receive, at any instant in time, either the same voltage waveform or a different voltage waveform. Adjacent pixels receiving different voltage waveforms generate corresponding movement of dipolar entities, including dipolar particles, ions, or dipolar molecules in the polarizable liquid medium between the electrodes, which can in turn generate fluid flow and movement of particles suspended in the fluid along the planar array surface.

The planar array of pixels is connected to a control circuit which:
 (i) generates and distributes a designated voltage to each array column line;
 (ii) applies a gate voltage to activate the switch associated with each pixel in a selected row;
 (iii) charges the pixel capacitor and then maintains the designated voltage as the switch is deactivated;
 (iv) repeats steps (i) and (iii) for each row such that the entire array is scanned successively;
 (v) performs steps (i) to (iii) so as to apply time-varying voltage bitmap to the active pixel array; and
 (vi) adjusts the voltage bitmap and/or the waveform specifications in a slow time-varying fashion according to the actual operation.

The switching frequency is adjusted to minimize the loss of charge by each pixel between successive activation cycles and to generate a "pseudo-waveform" wherein each pixel involved in generating the waveform provides a progressive change to the signal in each activation cycle. The medium is moved by the pseudo-waveform, and movement is not substantially affected by the voltage variations between successive activation cycles, given that the switching frequency is high.

The control circuit also permits different pixels, and different pixel regions of the array, to be operated at different frequencies. This permits a variety of operations to be performed, as further elaborated below. In particular, particles in the medium can be separated based on their respective dielectric relaxation frequencies.

In one embodiment, pixels form elements of an integrated microelectrode device. The device is made chemically and electrically uniform by coating the entire surface with an insulating layer; preferably a high dielectric constant material, for example, $Ta_2 O_5$. This material has a very high $\in$ of about 25 and is known to be inert in the presence of electrolytes, and is easy to grow on a Ta substrate anodically. It also forms effective anti-reflection coatings (with a desirable refractive index), at the interface between water and silicon, and is therefore desirable for use in connection with optical detection of assays. Such material will permit a thicker dielectric layer to be used for a given capacitance, which preferably is to be of comparable magnitude to that of the liquid medium double layer. Increased thickness of the dielectric layer reduces pinholes in the layer, and thus reduces leakage current and faradic reactions.

Switching signals to activate pixels and signal voltages and frequencies are preferably under direct control. A preferred control system is a microprocessor or a computer. It is possible to use any of a number of circuit designs to achieve such control.

Thus, there is provided an electronically controlled, dynamically configurable electrode to generate changing patterns of the interfacial polarization at the electrolyte-insulator-metal interface and to control the flow of the liquid medium and the movement of particles in the medium. The pattern can be programmed to move, hold, assemble or disassemble groups of particles in virtually any configuration desired, including patterns as disclosed in U.S. Pat. Nos. 6,468,811 and 6,387,707 (incorporated by reference). Similarly, groups of particles can be fractionated based on their respective relaxation frequencies, by controlling the frequency of the signal voltage. Fractionation based on relaxation frequency is discussed more fully allowed U.S. application Ser. No. 09/813,571, filed on Mar. 21, 2001 (incorporated by reference).

Among the advantages of the system of the invention over use of light to create electric field gradients, and effect particle transport, are that the voltage signals are applied directly to individual pixels to act on the solution above through a thin oxide layer, without the necessity to modify the impedance of the substrate (and create voltage contrast as a secondary effect) by light or thickness patterning. The individual pixels allow electric fields generated to be better defined with less "blurring" at the edges. Minimal "blurring" can be controlled by adjusting the distance between adjacent pixel edges. However, the "blurring" edge can, in general, be controlled by applying signals of progressively incremental/decremental magnitude to pixels in the transition zones, between two designated locations.

The electrode of the invention is useful in a number of applications, including but not limited to transporting cells or transporting particles used in or associated with biological assays, including, for example, particles having nucleotides, proteins, antibodies or other biological agents attached. Alternatively, the electrode can be used to effect printing operations, by selectively attracting charged particles to regions of the planar surface. Other particle assembly operations have applications in the formation of modified surfaces and optical elements. Features of the electrode and the method of making and using it are described in further detail below, with reference to the drawings.

DETAILED DESCRIPTION

1. Design Considerations for an Integrated System

Figure 41:
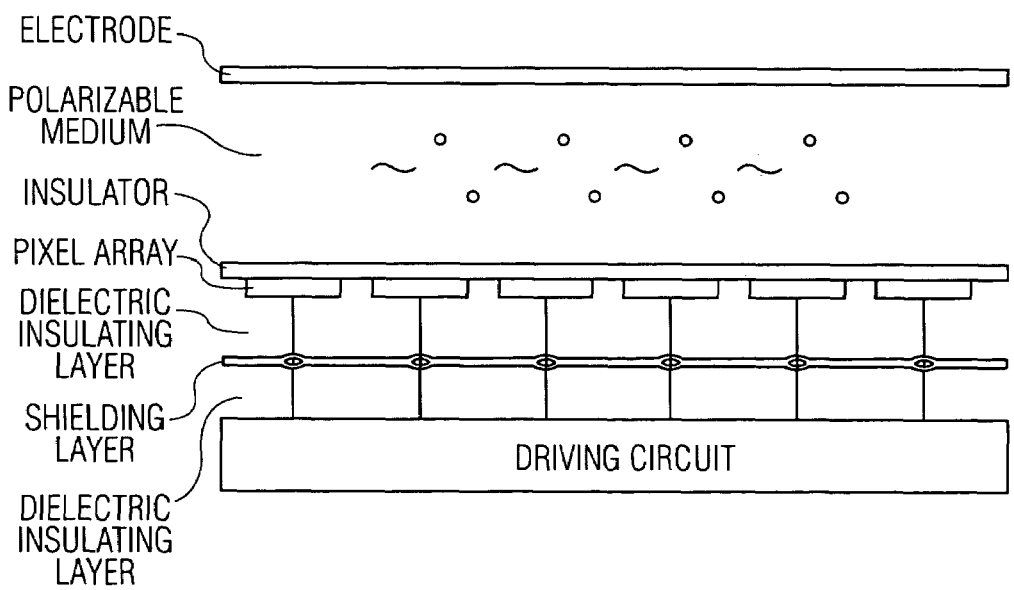
FIG. 41 is a sectional view of an upper planar electrode structure, with a polarizable liquid medium between the electrode and an insulator, a pixel array beneath the insulator, a shielding layer beneath the pixel array, a dielectric insulating layer and a lowermost driving circuit.

Herein, a particle-containing polarizable liquid medium is sandwiched between a common electrode and a semiconductor chip. See FIG. 41. On the chip side, the liquid medium is in direct contact with a thin layer insulator that covers an array of pixel electrodes. The pixel electrodes are individually addressable. They are connected via interconnects to the driving circuitry below, which supplies to them their designated voltage waveforms. There is a shielding layer between the pixel array and the driving circuitry in order to eliminate electronic interference between the two.

In one embodiment, each microelectrode in the pixel array is connected with a switch. Each switch has one end connected with the microelectrode pixel, and the other end connected with a column line which provides the signal voltage data column-by-column, and a row line that provides the enabling signal. Row lines are sequentially scanned. The signal voltage can be provided in a specified waveform and at a specified frequency. In operation, the data bus provides a signal to all columns, then a particular row is enabled. The cycle is repeated for each row in succession, and then started over from the beginning after enablement of the last row.

Figure 1:
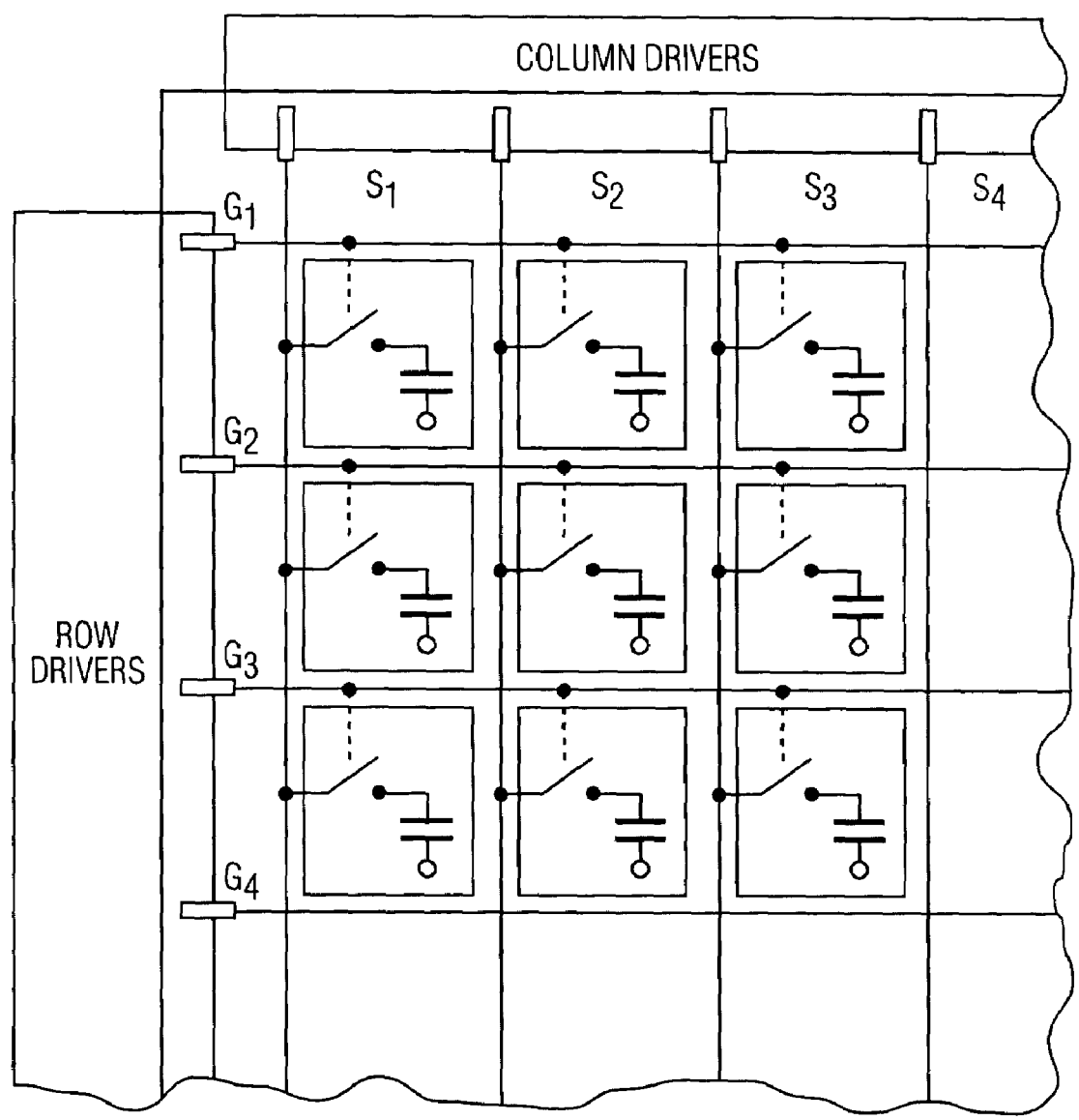
FIG. 1 is a representation of an exemplary array of microelectrodes, as set forth herein.
Figure 2:
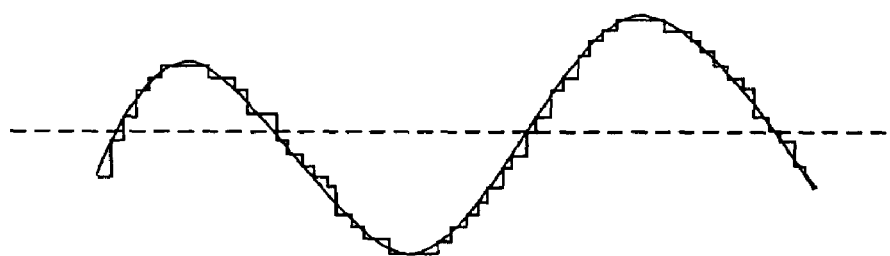
FIG. 2 shows a "pseudo-waveform" (the fluctuating line indicates the actual incremental voltage signal applied to the microelectrodes, and the central line indicates the pseudo analog waveform "seen" by the liquid medium.

An exemplary system is shown in FIG. 1, where each pixel is individually addressable by selecting the appropriate two contact pads at the ends of the rows and columns. By scanning the gate bus-lines sequentially, and applying signal voltages to all source bus-lines in a specified sequence, all pixels can be addressed. When the row driver is addressing one row, all other rows are deselected and all switches in those rows are turned off.

Each pixel is designed to hold the majority of the charge applied (i.e., the microelectrodes have minimal current leakage) when it is de-selected and "off" between addressing cycles. The frequency of the signal switching is high enough to allow the dynamic imaging of a "pseudo-waveform" (which is a stepped waveform representation of the actual analog signal provided by the switches) on the pixel electrode. For example, if a pixel has an operating frequency of about 500 Hz, a switching frequency of about 10 khz would be the right order of magnitude. The switching frequency for forming the pseudo-waveform has to exceed a certain frequency threshold such that the irregularity of the waveform has a negligible impact on particles in the adjacent medium undergoing electrokinesis. For example, when the pixel operating frequency is in the low frequency (500 Hz) AC mode, the irregularity induced by a switching frequency of greater than 100 kHz will have a negligible impact on the adjacent electrolyte, in terms of the magnitude of the high frequency, because the ions in solution have a low mobility and cannot follow such a rapid transition.

Because the switching mechanism provides control over the voltage change of individual pixels, for each pixel, both the frequency and the signal waveform can be independently controlled. Accordingly, different regions of the substrate can operate at different frequencies. However, only a low frequency signal, e.g., 1 kHz or less, can induce ionic flow (and therefore, fluid or particle flow) whereas a high frequency signal (typically above 10 KHz) cannot. A high frequency field will, however, induce an electrokinetic effect, because the high frequency field can penetrate the ionic double layer in the electrolyte with little attenuation. Either ionic and fluid flow alone or electrophoresis alone may be desired for certain applications. In addition, a combination of low and high frequency signals allows both ionic flow/fluid flow and dielectrophoresis to take place simultaneously, which may also be desired for certain applications.

If different regions are provided with different signal waveforms, the control of fluid flow patterns and particle motion can be achieved. It is then possible to form a number of regions of particles, and move the particles in and out of these regions as desired.

Similarly, as noted above, providing different frequencies to different regions permits separation of particles based on their relaxation frequencies. The separation between adjacent pixels should be sufficiently small to ensure the continuation of the fluid flow and the assembly of particles in a designated collection area, delineated by a group of pixels supplied with the same voltage signal. Moreover, in operation, in order to produce particle movement, one must generate minimal spatial modulation in the interfacial polarization of medium which is in fluidic contact with adjacent pixels operating at the same waveform and voltage, while maximizing the spatial modulation of interfacial polarization of such medium between pixels at different waveforms or voltages. Thus, the gap distance between the adjacent pixel electrode edges is adjusted to optimize operation. The gap distance is adjusted as a function of the size of the pixel, the thickness of the upper thin oxide layer, and the thickness of the dielectric layer between the pixel electrode and the shielding. It should be designed such that the transitional voltage along the surface of the upper thin oxide layer between adjacent pixels is always between the high and low voltage levels of the two pixels ("not to form a dip"), when two different voltage voltages are applied, whereas the field strength about the gap is below breakdown. In implementation, the microelectrode layout and vertical profile may vary, but the same profile at the interface between the microelectrode layer and thin dielectric layer covering it should be maintained.

2. Design of an Integrated Microelectrode

In one embodiment, the dynamically configurable electrode is produced monolithically, modeled on a conventional CMOS fabrication. The addressable pixel array is integrated with the driving circuitry.

Figure 3:
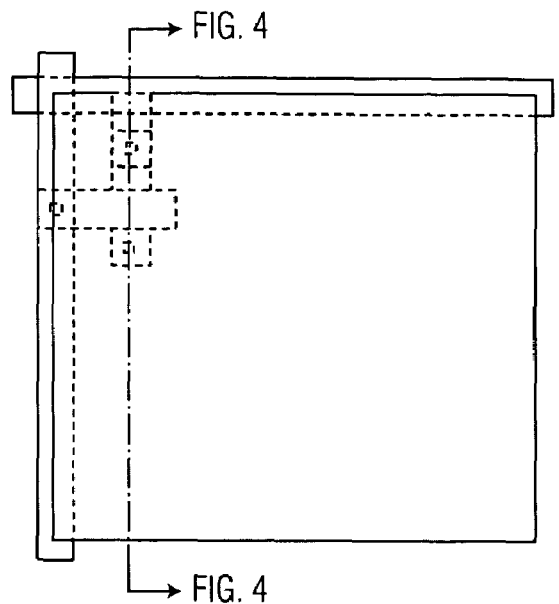
FIG. 3 is a plan view depiction of an exemplary pixel microelectrode.
Figure 4:
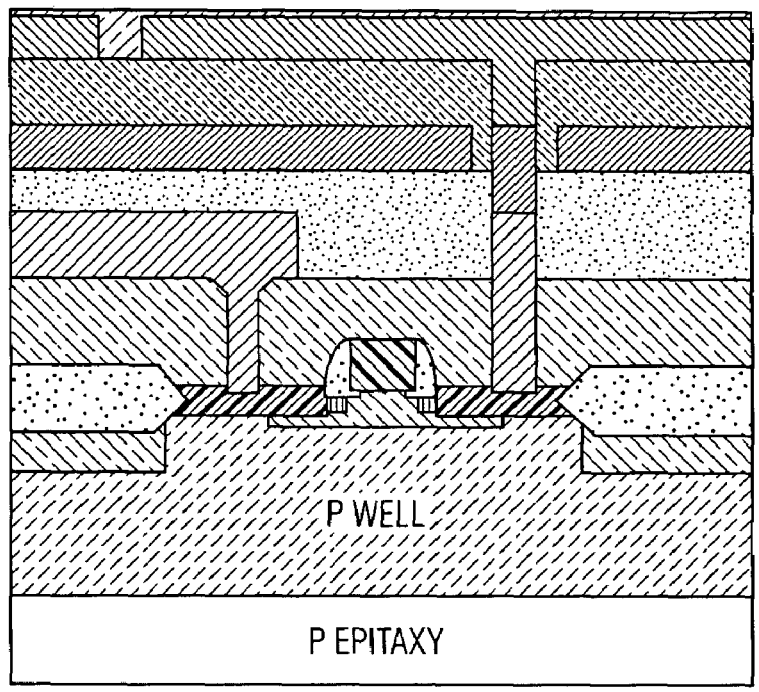
FIG. 4 is a sectional view (along lines A-A' of FIG. 3) of the pixel microelectrode of FIG. 3.

FIGS. 3 and 4 below depict a simple exemplary integrated structure of an individual pixel microelectrode. This microelectrode can be fabricated as follows. On a p/p+ epi substrate, an n-channel MOS transistor is fabricated, following active region patterning and field oxide growth. After dielectric-1 deposition and planarization, metal-1 is sputtered and patterned by photolithography, followed by etching. The same procedure is repeated until the top electrode of the capacitor, metal-3, is formed. The dielectric layer separating metal layers in this embodiment is silicon oxide ($SiO_2$). Following formation of metal-3, a dielectric layer of $Ta_2O_5$ is deposited, planarized, and then etched such that metal-3 is exposed but the gaps between the metal-3 electrodes are filled. Finally, a high quality, thin, high dielectric constant ($\in$) material such as $Ta_2O_5$ is coated over the entire upper surface to insulate the electrodes from the electrolyte. Anodization can be used as the coating method, because of the low leakage associated with the resulted film. Metal-1 forms signal electrodes, connected to the sources of the switching transistors, and also serves as part of the interconnection between the pixel electrode and the underlying device. Heavily doped poly wires the transistor gates to the row selection buses. In some cases, following poly doping, a metal coating and silicide formation step may be preferred to further reduce serial resistance of the poly wires. Metal-2 forms a common electrode of all the pixels. This electrode serves as a shielding layer between the upper electrodes (metal 3) and the driving circuitry. The gap distance between the pixel electrode and the shielding layer should be adjusted such that the capacitance between the two is small compared to the capacitance between the pixel electrode and the liquid medium. Furthermore, the top $Ta_2O_5$ layer should be thin enough to ensure that the capacitance between pixel electrode and the liquid-insulator interface is smaller than or at least comparable with the double-layer capacitance at the interface. The net result is that between the pixel electrode and the common voltage, the double-layer capacitor receives substantial signal voltage.

For example, a 1-um thick $SiO_2$ ($\epsilon_r$=3.9) dielectric layer (C=3.45 nF/cm$^2$) and a 100-A thick $Ta_2O_5$ ($\epsilon_r$=25) top layer (C=2.2 uF/cm$^2$) ensures the areal capacitance of liquid-medium double layer ($C_{DL}$~1 uF/cm$^2$ for 0.01 mM 1:1 electrolyte) dominates so that 60% of the voltage signal is dropped across the liquid-medium double layer to induce the fluid motion. For a 2×2 um$^2$ pixel, the overall capacitance is about 30 fF, which is a typical value of the state-of-art DRAM storage node. There is no need to fabricate additional storage structures, as $C_{DL}$ is already one of a kind. Holes extending through Metal-2 allow interconnections between the upper metal 3 electrodes and the transistor drains.

Figure 5:
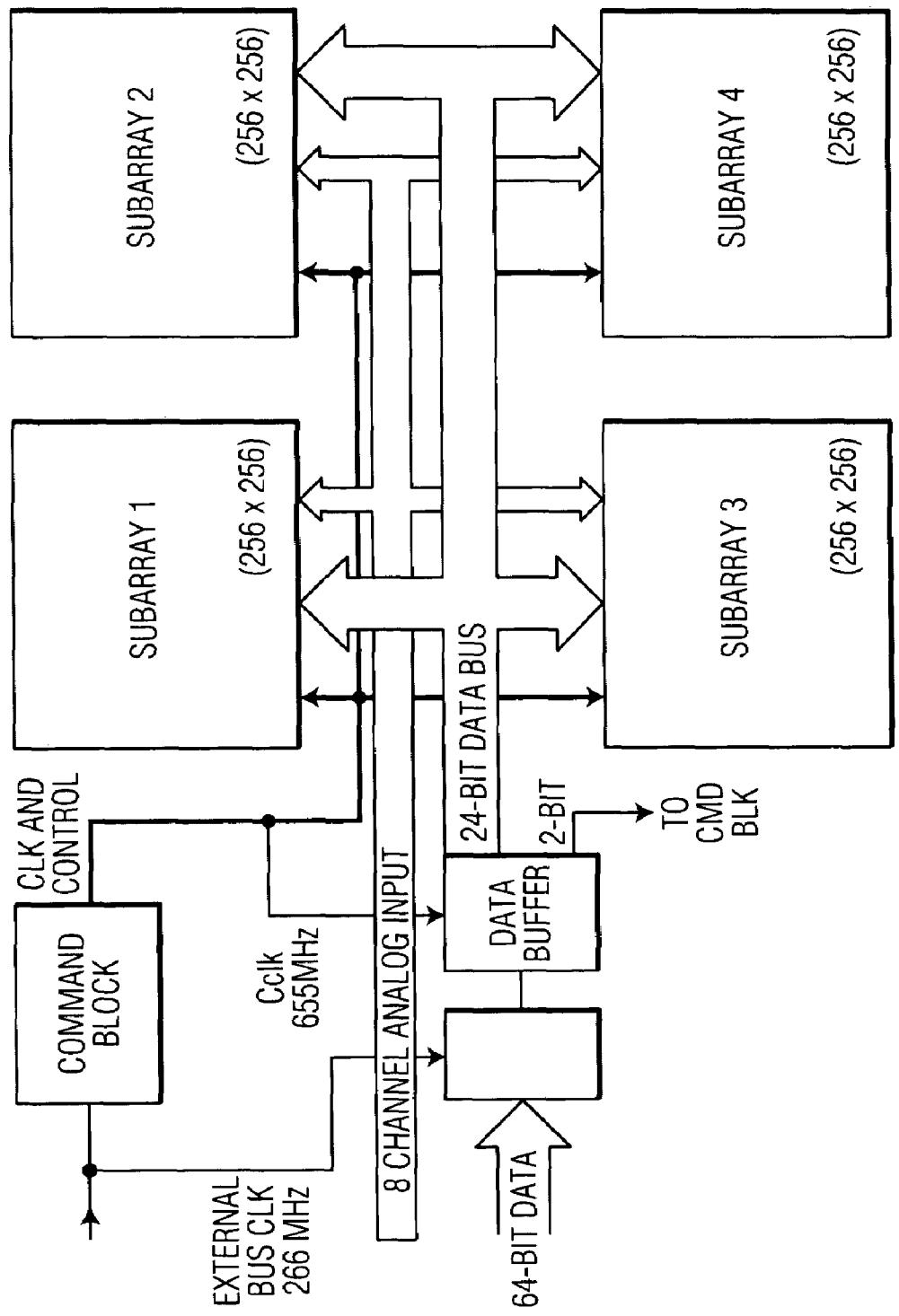
FIG. 5 depicts a platform chip having four major functional blocks: a command block that generates synchronous and control signals, a data buffer, an internal data and control bus, and a pixel array which may include a plurality of subarrays.

The architecture of the platform chip, illustrated in FIG. 5, comprises four major functional blocks: a command block that generates synchronous and control signals, a data buffer, an internal data and control bus, and a pixel array which may include a plurality of subarrays. To accommodate the appropriate frame rate in the subarray, the operating frequency of an internal master clock residing in the command block should match the highest switching rate of the chip, that is, the scan rate of the column driver lines. Random Dynamic Random Access Memory (DRAM) chips usually provide adequate storage capacity and bandwidth—for example, PC266 SDRAM has a 64-bit bus, 266 MHz clock and a bandwidth of 2.128 GB/sec. The clock frequency of the internal bus will normally differ from that of the internal master clock and, for a large array, may exceed it. This necessitates a data transfer interface to match the internal and external buses. In FIG. 5, a data buffer translates a 64-bit external data stream into an internal 26-bit stream. This configuration permits the rise of a faster internal bus at a frequency of 655 MHz to meet the requirement of the internal switching circuitry, while permitting full utilization of the external bus bandwidth.

Subarrays are operating synchronously and in parallel to form a large combined array capable of displaying a large seamless "image." The total number of subarrays depends on how high a clock frequency of the master clock can be realistically achieved. The upper bound is set by the time scale of the transient response, including transmission line delay and/or charging of the pixel capacitor. For example, a typical interconnect has a capacitance of 2 pF/cm when metal linewidth matches insulator thickness. The RC delay of a 0.25× 0.25 um$^2$ 100-um long aluminum wire ($\rho_w$≈3×10$^{-6}$ Ω·cm) can be estimated as $$\tau_w \approx \pi \varepsilon_{ins} \rho_w \frac{L_w^2}{W_w t_w} \approx 0.5 \text{ ps}.$$

The dominating capacitance of pixel elements is that of the ionic double-layer at liquid-insulator interface which, for a 0.01 mM 1:1electrolyte, is about 10$^{-6}$ F/cm$^2$, or approximately 40 for a 2×2 um$^2$ pixel. Assuming the channel resistance (10$^4$ Ω) of the switching transistor to dominate the total resistance, the transient time due to charging of the double-layer capacitance can be calculated as:

$$\tau_w \approx R_{MOS} C_{DL} \approx 0.4 \text{ps}.$$

Considering both contributions, the total transient response time will be of the order of ~1 ps, which is negligible compared to the 1 ns time interval of the master clock. In this situation, it is not absolutely necessary to divide a 1024×1024 array into four 256×256 subarrays as shown in FIG. 5; nevertheless, this configuration illustrates a parallel design that may be employed when the entire array is so large that the transient response becomes comparable to the characteristic time of the master clock.

Figure 6:
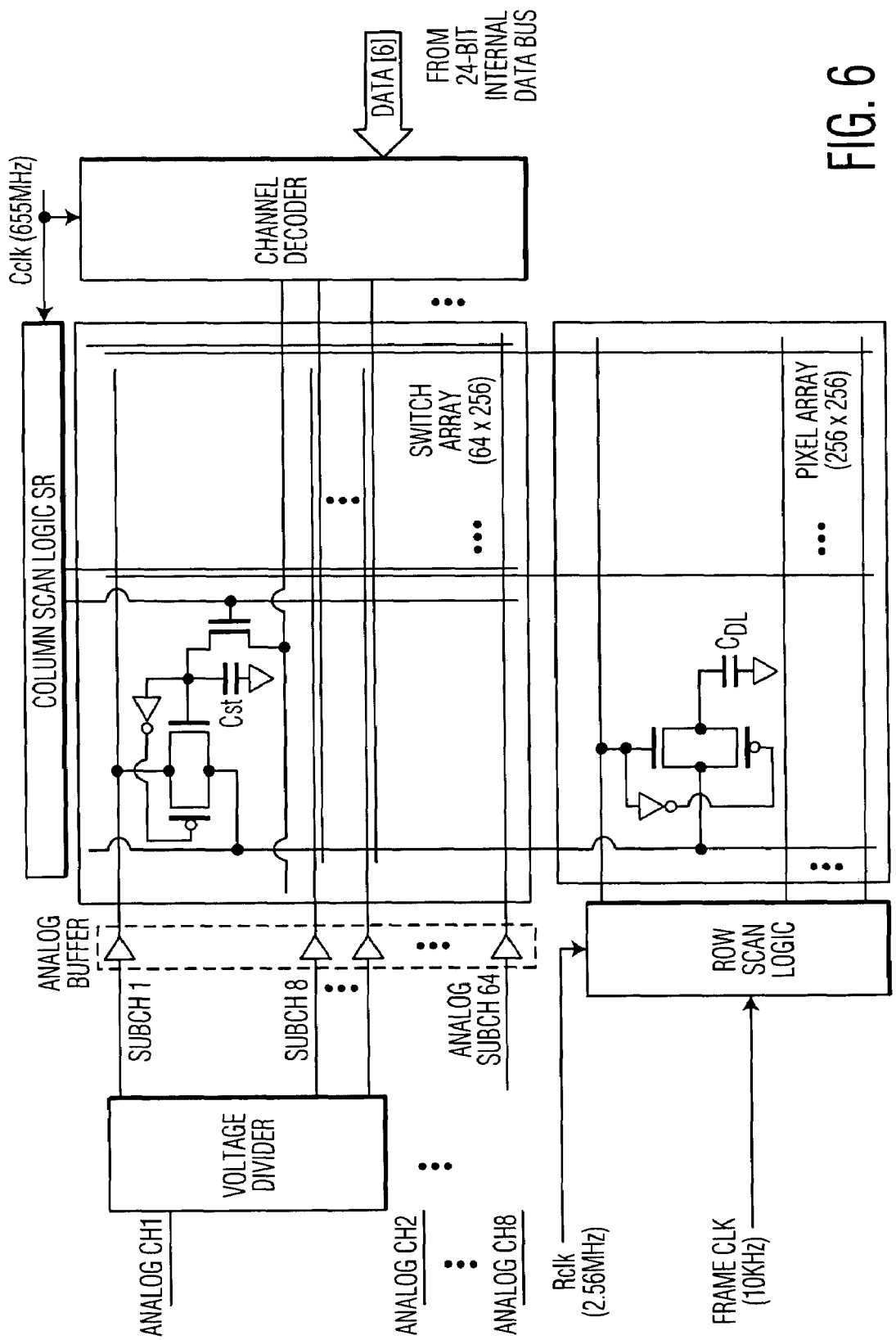
FIG. 6 depicts a subarray consisting of an analog channel division block, a switch array, and a pixel array.

Each subarray consists of an analog channel division block, a switch array, and a pixel array, as shown in FIG. 6. In the invention, subarrays are operated by transforming the original waveform of each channel into a number of similar but lower amplitude waveforms for corresponding subchannels. After passing through analog buffers such as voltage followers, signals from those subchannels are distributed by a cross point switch array onto the column driver lines which are connected to the pixel array. To improve the transient response, the preferred mechanism permits the use of a MOSFET switch transistor and a pass gate, an inverter and a storage node in each switching cell. As illustrated in FIG. 6, the gate of a switch transistor is connected to the column scan logic line, its drain to the decoder line and its source to the top electrode of the storage node, the pass gate, with one end connected to a subchannel line and the other to the column driver line, may be turned on by a logic "1" pass through the switch transistor, which is turned on by a logic "1" applied on the decoder line in the mean time. The storage node preferably employs a typical structure of that of a state-of-art DRAM cell, which has a typical capacitor of ~30 fF. The charge corresponding to the logic state stored in those cells is allowed to leak; however, compared to the time required to scan all of the column driver lines, the decay of stored charge is negligible. This "dynamic" logic also saves precious layout space. As the column scan logic sequentially selects each of the column select lines, data, indicating which one (and only one) of the switches along the selected column should be turned on, is allowed to decode in the decoder by the same clock signal and generates a logic "1" on the designated decoder line. As a result, the corresponding switch is turned on and voltage is connected to the column line. As the current column is deselected and next column is selected, the stored nodes of deselected cells should hold the correct logic states at the gate of the second transistor until they are next selected, so long as the fraction of stored charge that is allowed to "leak" is negligibly small. The column select logic preferably is a shift register which is configured in such a way that only one column is selected at a time and all columns are selected in turn.

Once all column driver lines are ready, the row select line of the designated pixel row in the pixel array receives a "1". As a result, the corresponding switching transistors of the entire row are turned on, thereby allowing all pixel capacitors along the row to receive updated voltage signals from the column lines. Similar to the switch array, the row select logic generates one logic "1" at a time, allowing only one row of pixels to be set updated, all rows being selected and updated in turn in order to form one frame corresponding to a specific voltage state of the pixel array.

As an example, in FIG. 5, for a master clock frequency matching the unknown scan rate of 655 MHz, and the row scan at a fraction of the master clock, for example, 2.56 MHz for 256 rows, the corresponding frame rate is 10 KHz.

Figure 7A:
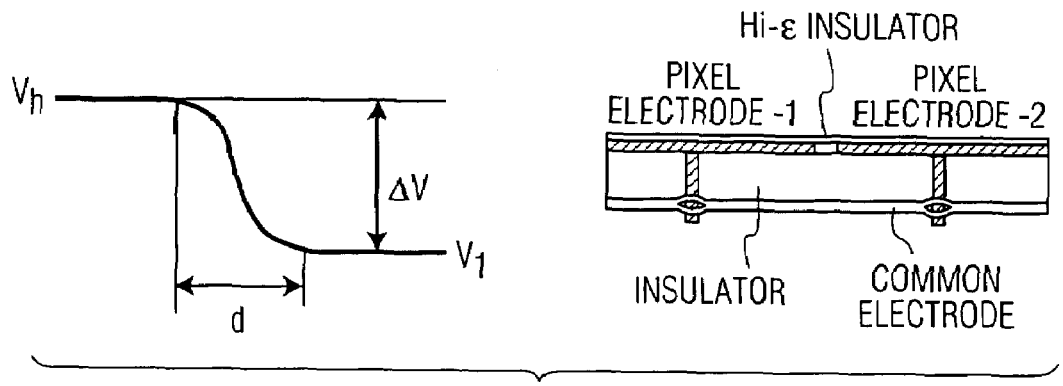
FIGS. 7A-C depict a drop in voltage between edges of adjacent electrodes, with FIG. 7B showing a larger gap between electrodes, and FIG. 7C showing a different configuration of electrodes.
Figure 7B:
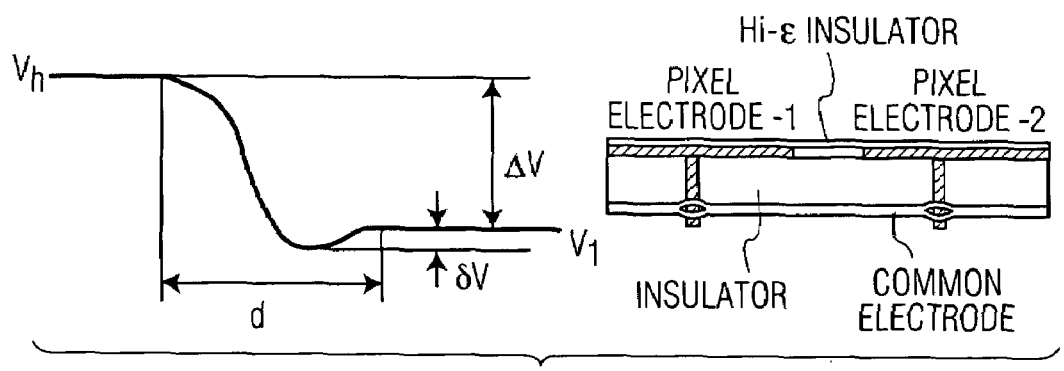
Figure 7C:
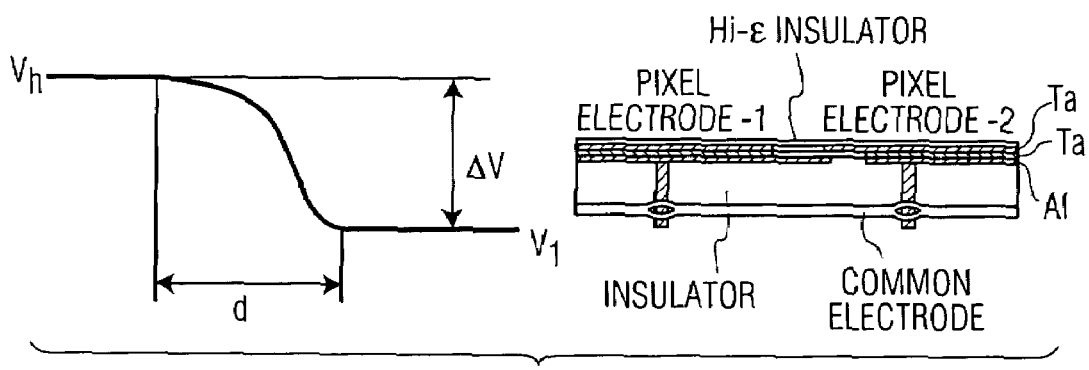

When adjacent pixel electrodes are connected to different voltage levels, an electric field is generated which surrounds the electrodes. As simulated and shown in FIG. 9, the field is distributed in the liquid as well in the insulating layer. A large gap may allow equi-potential lines to "leak" into the liquid through the gap and cause a voltage dip as illustrated in the plot in FIG. 7B. An preferable arrangement of the electrodes is shown in FIG. 7C, in which the thin extension of one electrode is buried underneath the thin extension of the adjacent electrode. The vertical alignment of the edges of the two extensions allows some overlaps, which prevents the equipotential lines within the insulator from "leaking" into the liquid. As such, a dip will be absent, as illustrated in the plot of FIG. 7C.

As an example of fabricating such structure, multiple steps are involved which include the deposition of a dielectric stop-etch layer and of metal film deposition, repeated three times, and patterning twice with dielectric layer deposition and planarization. At first, one deposits a thin layer of Aluminum Oxide ($Al_2O_3$) on the insulating layer which is on top of the shielding layer. A layer of Aluminum (Al) is then evaporated, patterned and etched, following which a second layer of transition metal Tantalum (Ta) is deposited, patterned, and etched. This step involves an etching gas mixture that, in plasma state, etches Ta at a much faster rate than Al. As soon as the exposed Ta is all etched away, the process will automatically stop as the plasma reaches the $Al_2O_3$ layer. The measurement on the etch rate of different materials is described in K. R. William, et al., J. Microelectromech. Sys. Vol.12, No. 6, pp. 761-777 shows that Ta ion-mill-deposited at 1250 V, with a current density of about 2 $mA/cm^2$, p=3× $10^{-4}$ torr, has an etch rate of 37 nm/min in an RIE chamber (Surface Technology System 320) using $SF_6$=25 sccm, $O_2$=10 sccm, P=100 W at 13.56 MHz, p=20 mtorr. Aluminum evaporated from a tungsten wire in the same plasma was measured with an etch rate of <2.8 nm/min, and $Al_2O_3$ evaporated from an alumina source had an etch rate less than 0.41 nm/min. Following the etching of Ta, a dielectric layer is deposited conformally to fill up the gaps. Then the entire surface is planarized until the dielectric layer covering the metal layer is all removed and filled dielectric material with gaps is flat with the metal. A third layer of metal, that is Ta, is then deposited, patterned and etched. Again, a layer of dielectric layer is deposited conformally to fill the gap, which is then etched away only to leave a filled gap flat with the metal. Finally, a high quality thin layer of $Ta_2O_5$ film is deposited on top of the pixel layer, preferably <200-A thick, to cover the entire surface. The low-temperature deposition of an ultrathin $Ta_2O_5$ film may be performed using state-of-art chemical vapor deposition (CVD) such as UV-assisted CVD. See J. Y. Zhang and I. W. Boyd, App. Phys. Lett., Vol. 77, Issue 22, pp. 3574-3576.

There are two primary reasons for using a high dielectric material, e.g., $Ta_2O_5$ (having an $\in$ of about 25) on the upper surface of the pixel. First, it is possible to increase the dielectric layer thickness by using a higher $\in$ material for a given capacitance. The insulating layer capacitance should be comparable in magnitude to that of the electrolyte double layer, typically several micro-farads per $cm^2$. For $SiO_2$ the corresponding insulating layer thickness would be in the range of tens of angstroms. Making such a film stable is very difficult. By using high $\in$ material, such as $Ta_2O_5$, a film up to hundreds of Angstroms in thickness may be used, which greatly reduces the number of pinholes in the film, and also improves the surface uniformity.

The second reason for using a high $\in$ material is that the coupling of the electric field into the liquid medium (for example, water with $\in$ of about 70) becomes more efficient. This relates to an important part of the design of the dynamically configurable electrode of the invention. The distance between adjacent pixel electrodes should be small enough to produce a continuous transverse field across such distance, in order to prevent a significant dip and the possibility of localized flow, or no net flow, in between pixels. See FIGS. 7A-C showing the voltage drop between adjacent pixels at different gaps and conformations.

Simulations were performed to demonstrate that a transverse field could be generated with a pixel arrangement as described above. In these simulations (summarized below and illustrated in FIGS. 9 to 11), a DC rather than an AC current was used to illustrate such an effect.

Figure 9:
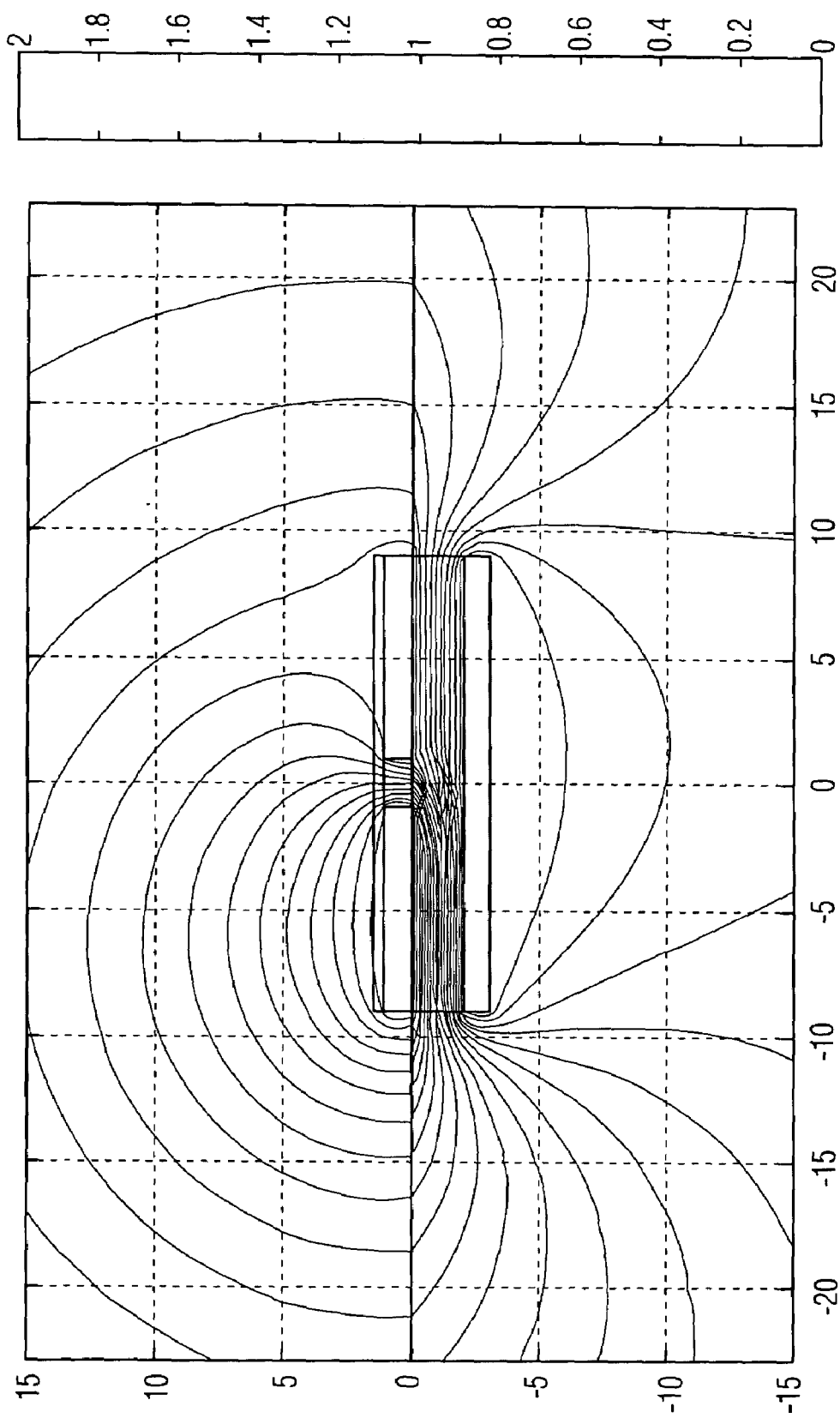
FIG. 9 depicts simulated fields with specified applied voltages, where there are two top electrodes, each being 8×1 $\mu m^2$, and the gap distance between the top electrodes is 2 µm, the distance between top and bottom electrode is 2 µm. A 0.1 um thick $Ta_2O_5$ layer is on top of the electrode water is above the electrode and $SiO_2$ is below.

A set of simulations was performed using Matlab (Mathworks, MA) to demonstrate the effect of the material and the thickness of upper dielectric layer, and spacing of adjacent pixel electrodes, on the lateral field gradient. The dimensions of the upper electrodes in FIG. 9 are: 8-µm long and 1-µm thick. The applied voltage on the left top electrode is 2 V and on the right top electrode it is 1 V. The bottom electrode is grounded to 0 V. The dielectric medium above the electrodes is water, and $SiO_2$ is below. The material insulating the top electrodes is a 1000-A° thick $Ta_2O_5$ layer. The distance between top electrodes is 2 µm. As can be seen in FIG. 9, the equipotential lines in the $SiO_2$, corresponding to the potential transition between 0 and 1 V, are completely sealed within the structure. Only the vertical potential contours between 1 and 2 V is seen above the $Ta_2O_5$ layer, and the field is directed along the surface, pointing from the left top to the right top pixel electrode, as expected.

Figure 10:
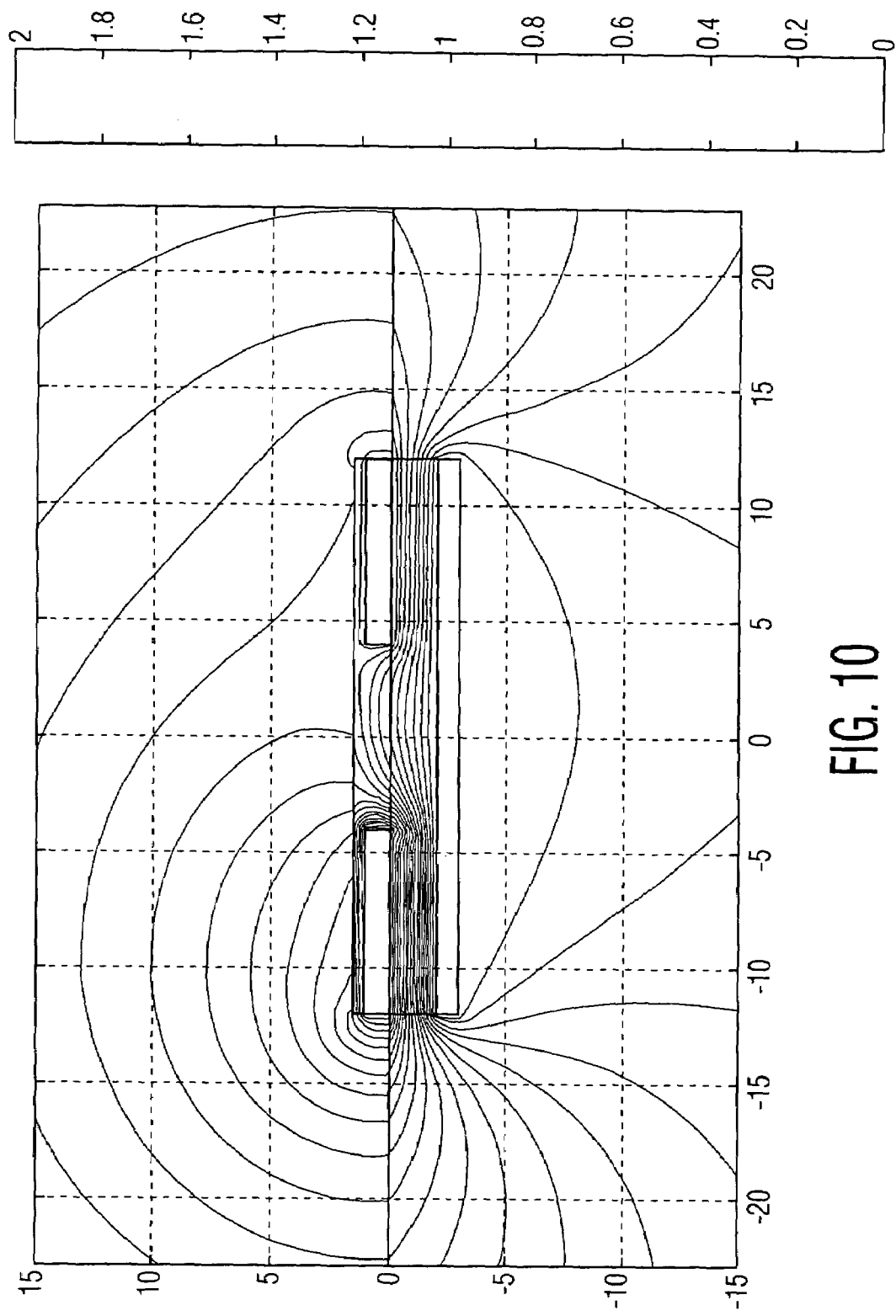
FIG. 10 is the same arrangement as FIG. 6 except that the gap distance between top electrodes is 8 µm and upper layer is 0.5 µm in thickness of $SiO_2$.

In FIG. 10, all conditions are the same as in FIG. 9, except that the distance between top electrodes is 8 µm, and the top layer is $SiO_2$ with a thickness of 0.5 µm. As can be seen, the equipotential lines in the $SiO_2$ layer, corresponding to the potential transition between 0 and 1 V, is not completely sealed within the structure and "leaks out" into the water. This makes the effective gap distance smaller and voltage dependent. In addition, the transverse field is non-uniform and the ionic flow is likely discontinuous near such a "voltage dip".

Figure 11:
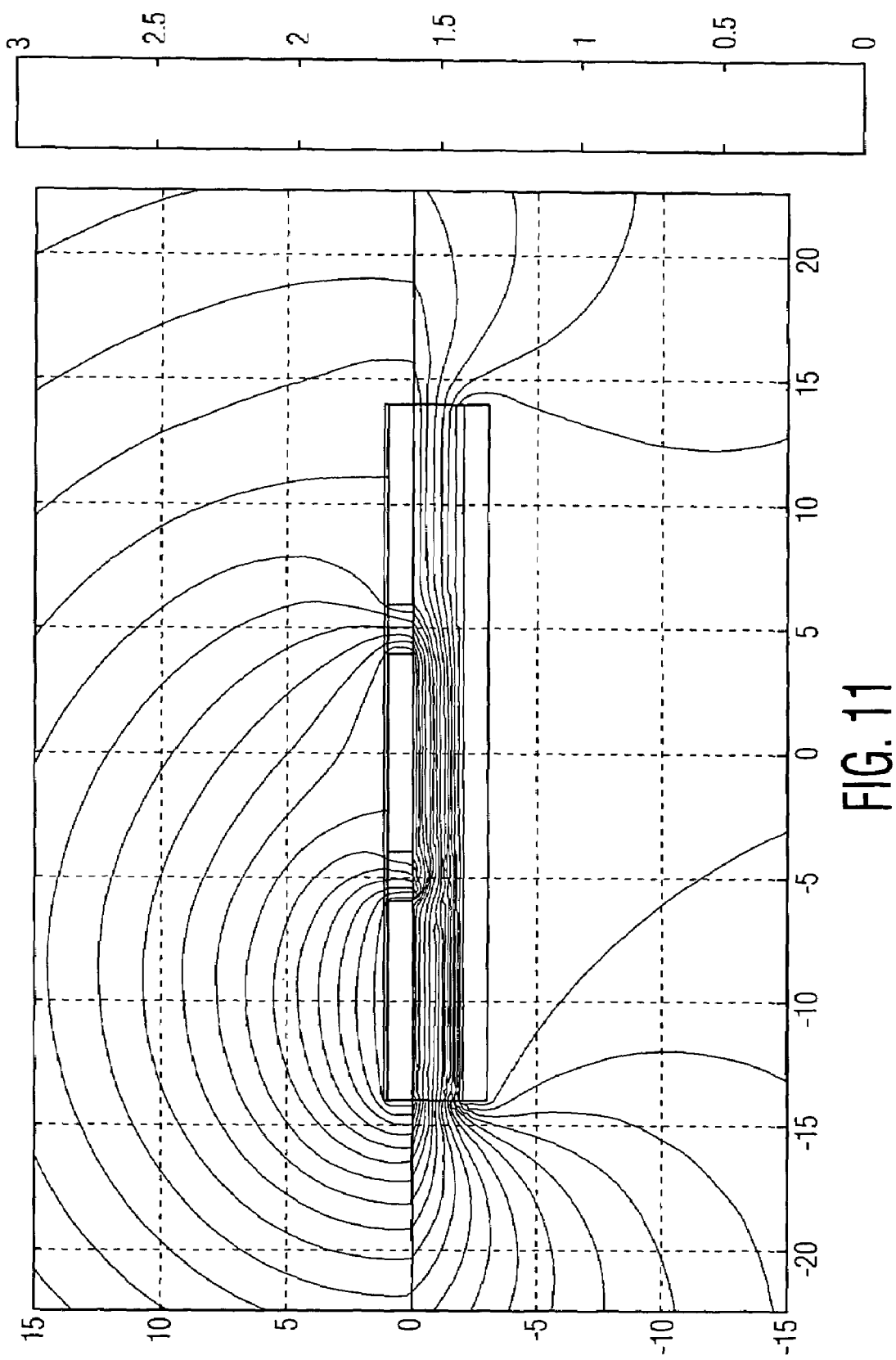
FIG. 11 is substantially the same arrangement as FIG. 6 but with three top electrodes, all at different voltages.

FIG. 11 depicts the field resulting from three pixel electrodes, with a gap distance of 2-µm between top electrodes. The voltage on the left electrode is 3 V, in the middle it is 2 V, and on the right it is 1 V. The bottom electrode is grounded at 0 V. A monotonic potential transition of potential is observed along the electrodes. Thus, a continuous ionic flow will be expected along the channel formed by the three electrodes.

These simulations demonstrate that with a proper selection of the distance between pixels and of the dielectric media, a monotonic potential along multiple pixel electrodes near the insulator/electrolyte interface is possible. Such field can induce continuous ionic flow and particle movement across the gap distance between adjacent electrodes and along the surface above multiple electrodes.

3. Control System Design

Figure 12:
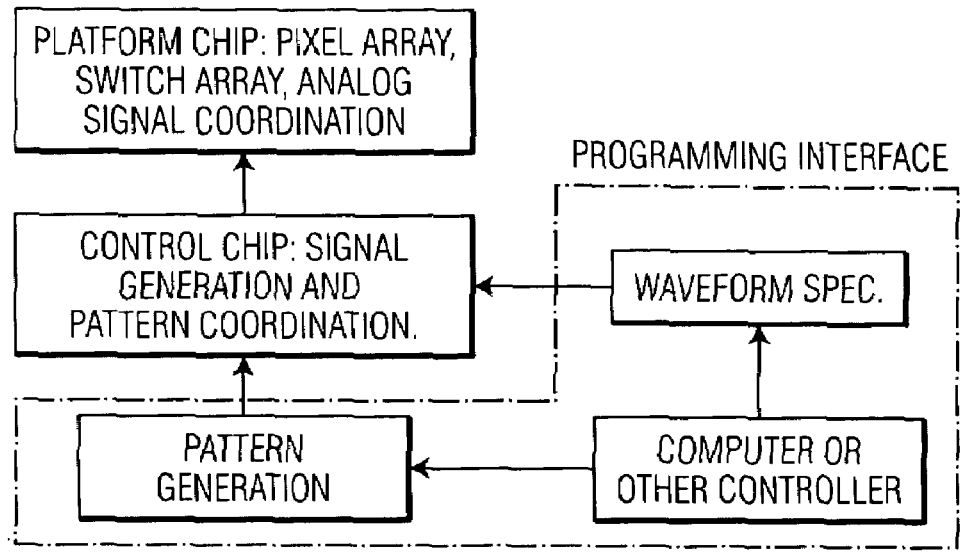
FIG. 12 is a schematic of pixel control circuit.

The invention can also include a software interface, to provide direct and real-time control. FIG. 12 shows the schematic of the control system, which consists of a control chip and the generation of real time data flow provided to a computer/controller interface. The role of the control chip is to generate analog signals and to coordinate with pattern updating on the platform chip. The inputs include waveform specification and real-time pattern generated by software programming interface. There is provided, therefore, a platform on which particle movement can be controlled, and on which biological assays on samples associated with beads or particles, or cells, can be conducted.

An overlap of functionality of the chips may be needed in practice. Refreshing or rewriting individual pixels is a high frequency operation, which has some regularity because, in general, one would not be generating arbitrary waveforms on each electrode on each cycle. The role of the control chip would be to maintain patterning, or, in implementation, to update registers in the memory that are associated with the pixel array (values such as waveform type, waveform magnitude, phase, frequency, etc) on the platform chip, in a slower time-varying fashion. The platform chip takes those values from the on-chip memory and generates column voltage values at high frequency and sets the voltages on pixel electrodes. The difference corresponding to high and low frequency regimes may be necessary, because in practice, clock frequency and data transfer rate among chips have limitations.

Figure 8:
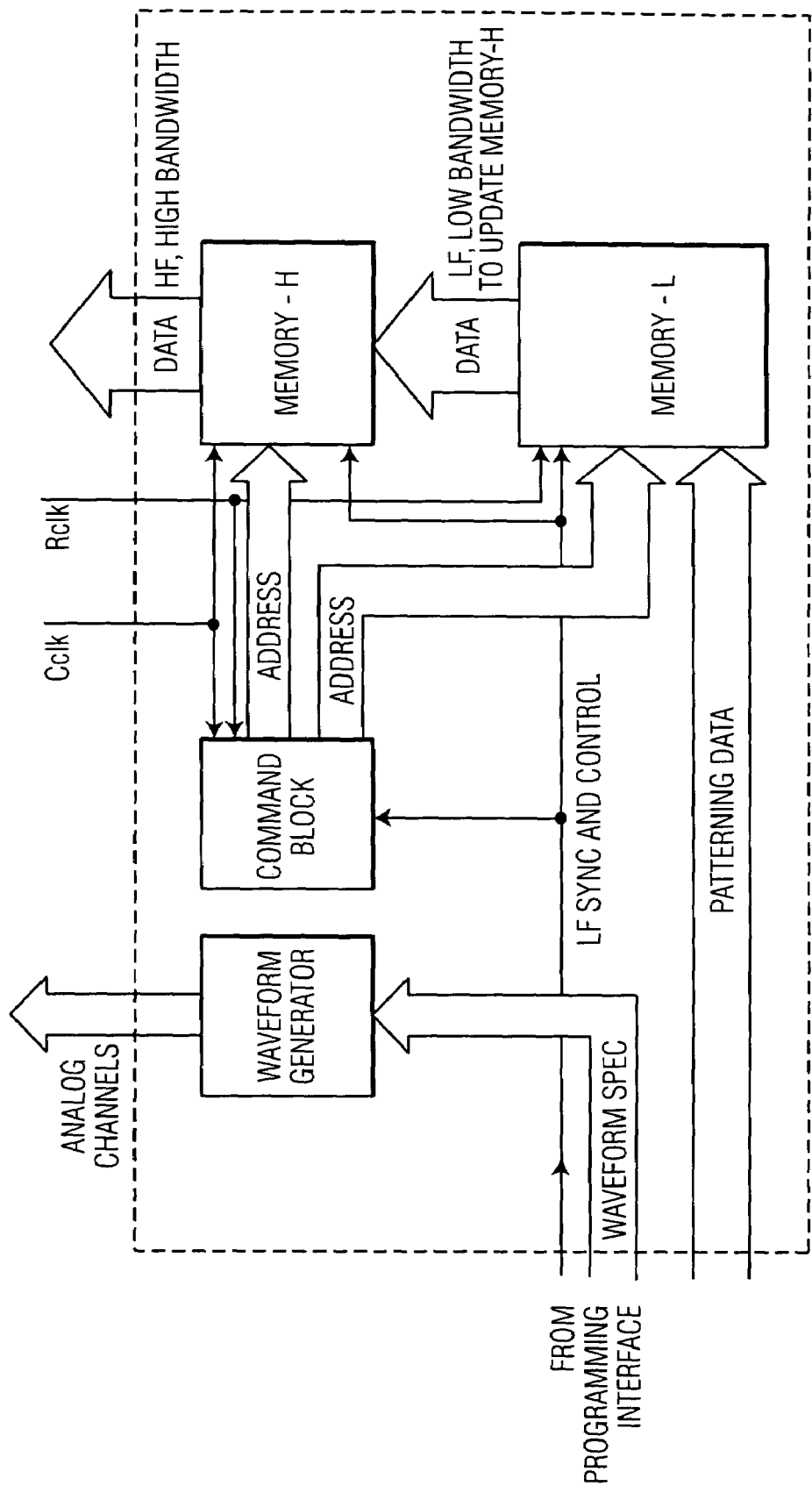
FIG. 8 depicts a control chip to coordinate the programming interface and platform chip.

A control chip coordinates the programming interface and Platform chip. As shown in FIG. 8, it comprises a waveform generation block, a command block and two memory circuit blocks. Timing signals of the control chip are routed from the switching clock (SCLK), row scan clock (RCLK) on a platform chip, and a system clock from the programming interface. There are two memory blocks on the control chip shown in FIG. 8: Memory-H and Memory-L. Memory-H is synchronized with SCLK, for example 655 MHz. It constantly feeds data into the input bus of the platform chip at a matching transfer rate. Real-time subchannel ID's of all the pixel elements in the entire pixel array are stored in Memory-H. Coordinated with the command block, Memory-L periodically updates the designated memory elements of Memory-H at a far slower rate so that data transfer from Memory-H to the platform chip is not affected. One may elect to use RCLK, say 2.56 MHz, for its synchronization.

If 10% of the array area evolves over time, it takes 40 ms to update all the designated elements. This is a time interval smaller than the typical time period for a particle to travel across one pixel. For example, if a particle moves at a velocity of 8 μm/s and the pixel size is 2×2 μm$^2$, it takes it 250 ms to pass the distance of one pixel length, which is long compared to 40 ms. While updating the memory content in Memory-H, Memory-L also receives data from the programming interface. Those two actions may occur at similar frequencies. For example, if RCLK is used for updating Memory-L, after each storage node releases its content (containing address and subchannel IDs), it immediately receives an updated one from the programming interface. Of course, actual frequency and implementation may differ to better serve such a purpose. If the control chip uses BICMOS technology, it may contain a waveform generation block that generates a set of analog signals with differing waveform shapes and/or frequencies in accordance with the waveform specifications sent from the programming interface. In general, there is no time-dependence requirement on the specification data; however, one may explore such a global evolution, as it is available. To implement this design, it is also possible to use a separate chip for waveform generation fabricated using bipolar technology or even a off-the-shelf device, and pack all digital circuitry on a second chip using CMOS technology.

The electric field generated may be configured in different ways by the control system. Transient fields can be configured to simulate the bright and dark regions associated with illumination-related control over the electric field. Fine control over particle movement and electrolyte flow is made possible by active matrix addressing and the ability to generate time-continuous, non-intermittent pseudo-waveforms, as described above, which is particularly beneficial to medium to low frequency operations.

4. Principles of Operation

Figure 13:
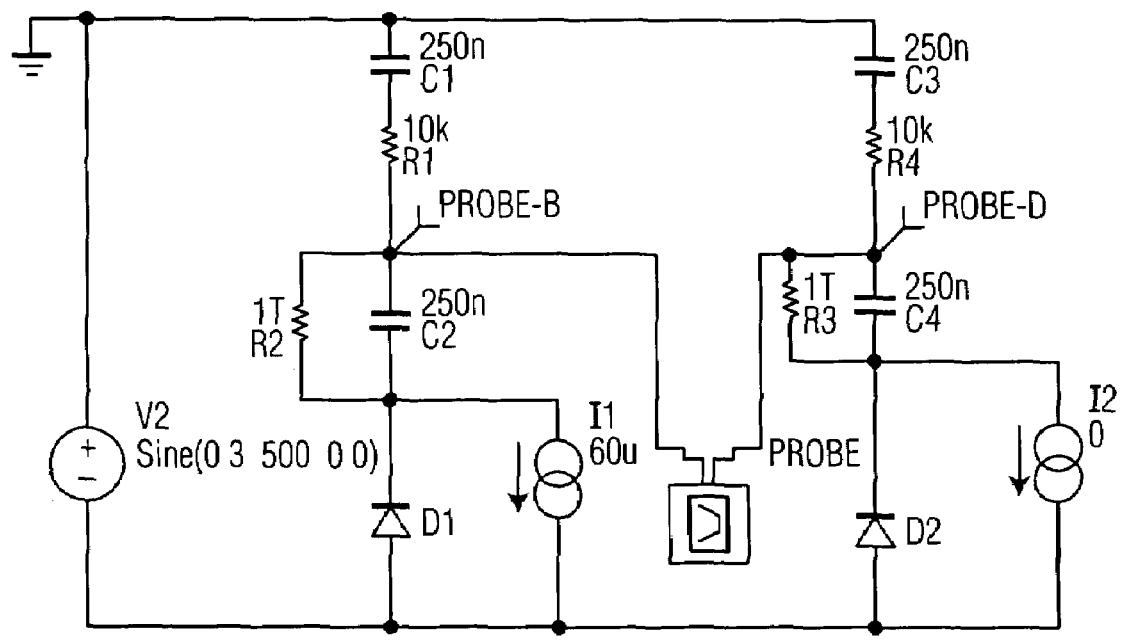
FIG. 13 represents a simplified equivalent circuit that generates the voltage waveform in FIG. 14.
Figure 14:
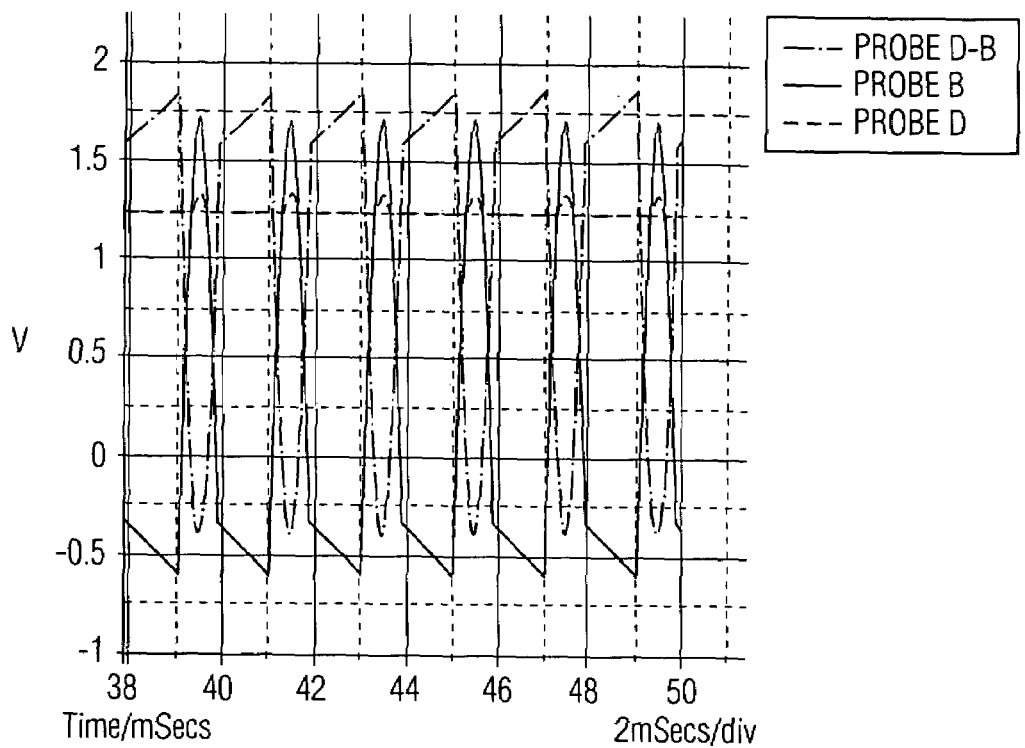
FIG. 14 is a voltage waveform generated by the circuit of FIG. 13.

Simulations, using light to induce electric field gradients, demonstrated that when illumination is applied on an enclosed region of a ITO-electrolyte-semiconductor sandwich structure, with an AC voltage of frequency f applied across it, ions are redistributed at the beginning of each half-cycle. FIG. 13 represents a simplified equivalent circuit that generates the voltage waveform in FIG. 14. The semiconductor surface was modeled as a diode in parallel connection with a DC current source that simulates the photocurrent induced by illumination. The voltage probes were placed on top of the equivalent capacitors corresponding to a double layer structure, to sense the voltage waveforms generated at an electrolyte-semiconductor interface in illuminated and dark regions. In the simulated voltage waveforms shown in FIG. 14, the dashed line, representing the potential above the double layer in the dark region, has a much smaller magnitude than that of the solid curve, representing such a potential in the illuminated region. The dash-dotted curve shows the difference in voltage between dark and bright regions. As illustrated in FIG. 14, because the sign of the potential in the illuminated area changes between half-cycles, the sign of the excess charge within the double layer also changes.

If, in the up-cycle in the AC-voltage, a negative excess charge of counterions accumulates, a transient transverse ionic current is carried by negative ions and flows to regions of higher surface potential (i.e., simulated bright regions). In the down-cycle, a positive charge, and a transient transverse current carried by negative ions will flow to regions of higher surface potential. In both half-cycles, the transient current flows in the same direction, namely toward "bright" regions of higher surface potential. That is, the transient current, and the corresponding fluid flow, are rectified. The voltage waveform at the electrolyte/insulator interface always has a higher peak-to-peak value in the illuminated region than in the dark background of the substrate.

Figure 15:
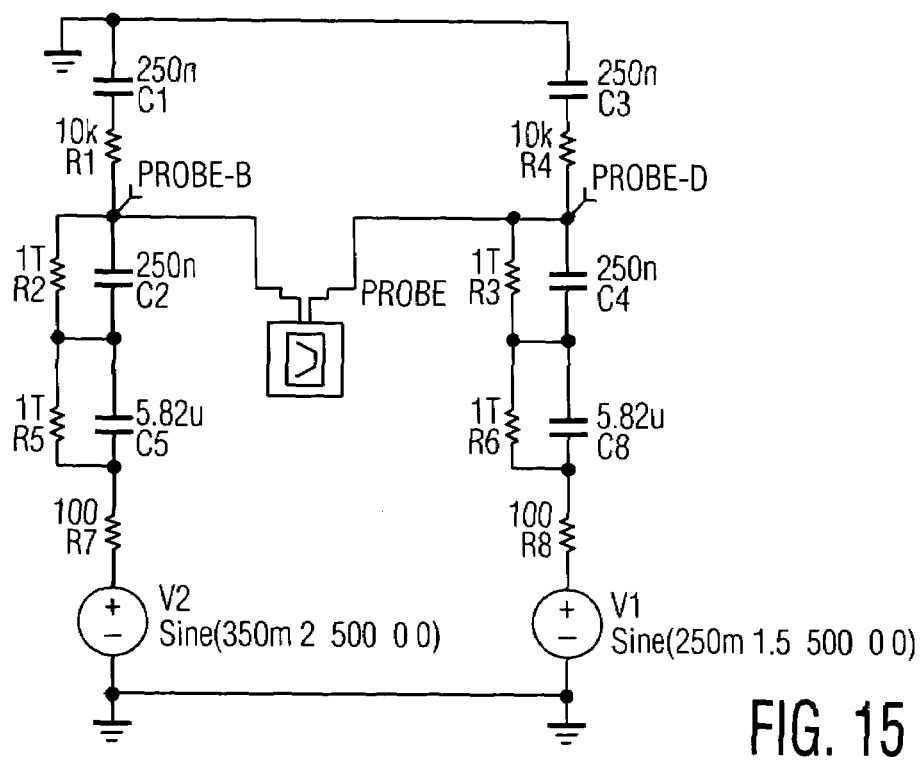
FIG. 15 represents a simplified equivalent circuit that generates the voltage waveform in FIG. 16.
Figure 16:
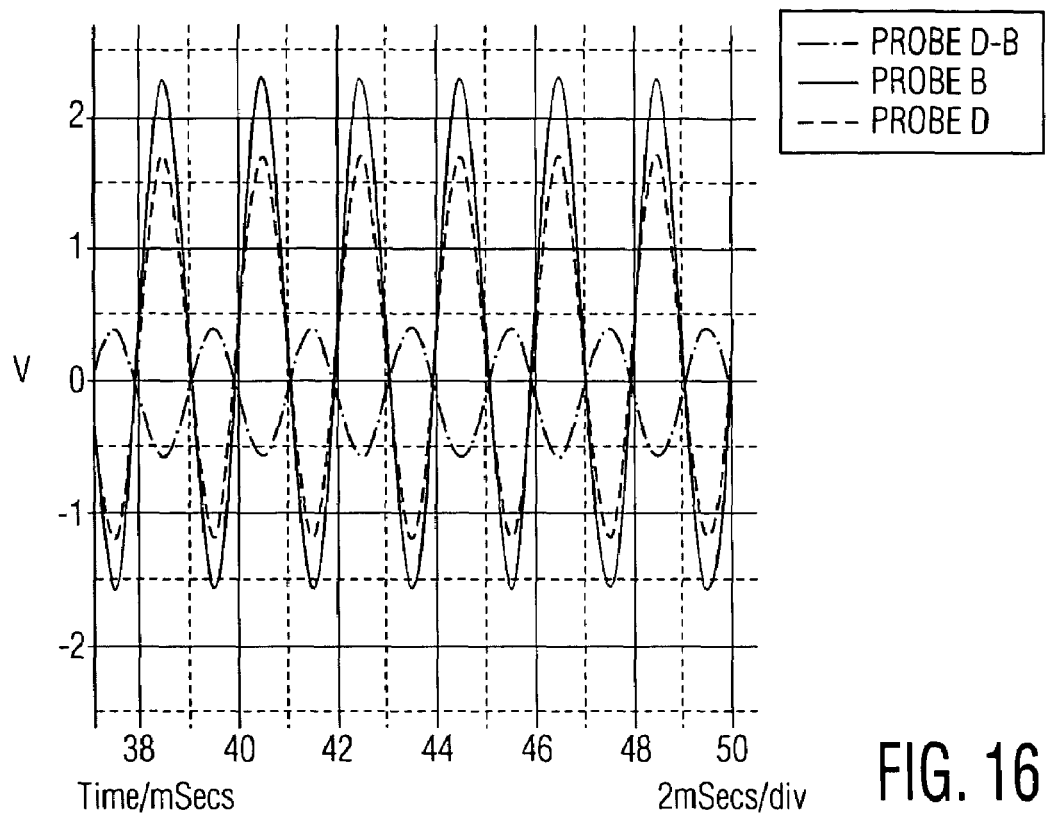
FIG. 16 is a voltage waveform generated by the circuit of FIG. 15.

Accordingly, similar ionic flow can be induced if the voltage waveforms, such as those shown in FIG. 14, can be generated above the corresponding area of a substrate surface. The electrode in this invention generates voltage waveforms by supplying a proper voltage signal directly to electrodes, which are buried just below the electrolyte-insulator interface. If the geometrical and physical parameters are properly selected, the voltage signal can be efficiently coupled into the interface and can generate the desired voltage waveform in the double layer structure. An equivalent circuit and simulated waveform for the pixel structure described herein is shown, respectively, in FIGS. 15 and 16.

5. Principles of Particle Transport, Assembly, Disassembly

Figure 17:
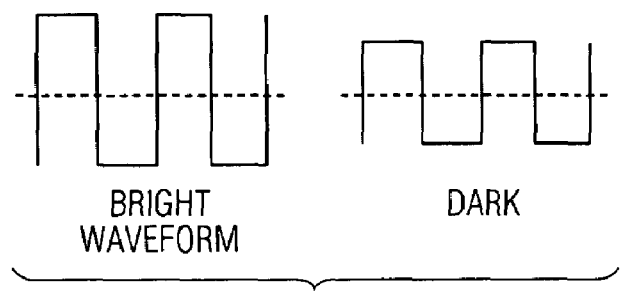
FIG. 17 illustrates a square waveform which may be used to effect particle transport.
Figure 18:
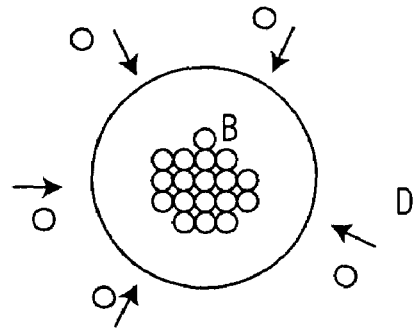
FIG. 18 is a plan view of fluid flow and particle movement when there is a dark or D-type signal outside of a circular region on the pixel array and bright or B-type signal inside such circular region.
Figure 19:
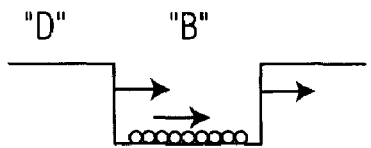
FIG. 19 depicts the wave form generating the fluid flow and particle movement in FIG. 18.

FIGS. 17 and 18 demonstrate the effect of having a D-type signal (of a smaller AC magnitude) outside of a circular region on the pixel array and a B-type signal (of a larger AC magnitude) inside such circular region. This generates a fluid flow field pointing towards the center of circle and thus is able to collect and assemble particles (which could be beads, cells or other types of particles) in B region. If this circular structure is moved along the array surface, the particles will be maintained in the same spatial configuration relative to each other (i.e., they will maintain an array configuration) but will be transported along the surface.

Figure 20:
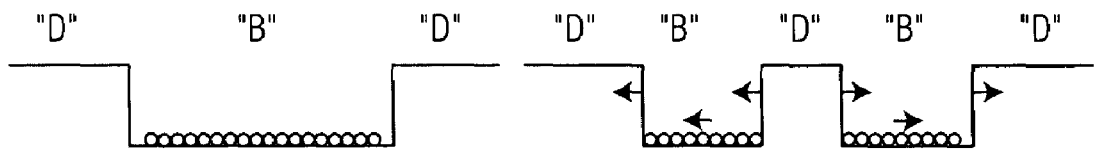
FIG. 20 depicts fluid flow and particle movement in a particular regime of bright "B" and dark "D" regions.
Figure 21:
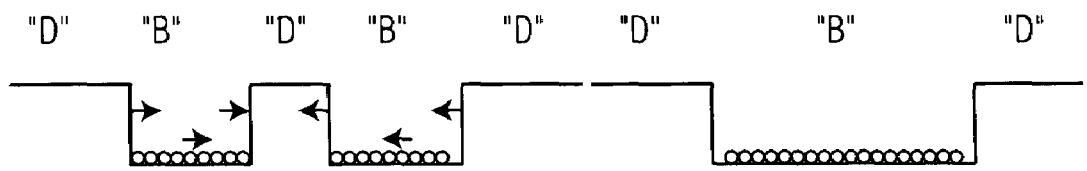
FIG. 21 depicts fluid flow and particle movement in another regime of bright "B" and dark "D" regions.

Array fragmentation and merger can also be accomplished. As shown in FIGS. 20 and 21, at time 0, the particle array is formed and entrapped in regions which have an applied B-type signal. In FIG. 20, when a D-type signal region is created in the middle of B-type region, the array is split. The migration of arrays in different directions separates one array into two. On the two-dimensional electrode, fragmentation of a single array into multiple arrays can be accomplished using analogous signals. Alternatively, multiple arrays can be merged into one single array, as illustrated in FIG. 21.

Figure 22:
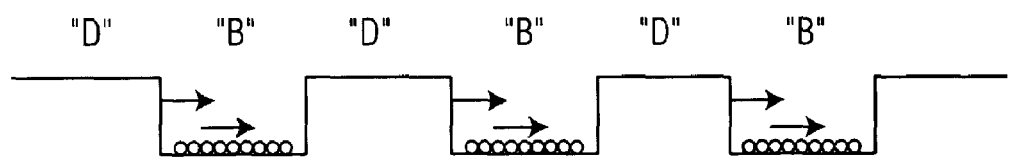
FIG. 22 depicts a particular regime of bright "B" and dark "D" regions suitable to generate fluid flow and particle movement along a channel.

Particle transport can be accomplished with either a digital-style signal, in a "boxcar" sequence, or with an analog-style signal, using an alternating long-range transport channel. For short-range transport, the digital style is preferred because only two types of signals are needed. The particles are then grouped into B-type regions, and several groups can be moving along the transport channel to other parts of the surface. See FIG. 22. In this method there is no AC magnitude gradient needed along the channel.

Figure 23:
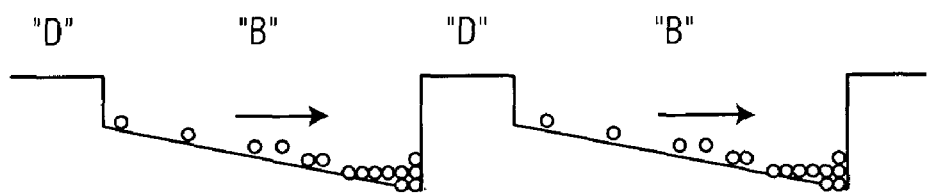
FIGS. 23 and 24 depict an analog wave form suitable for transporting larger numbers of particles.
Figure 24:
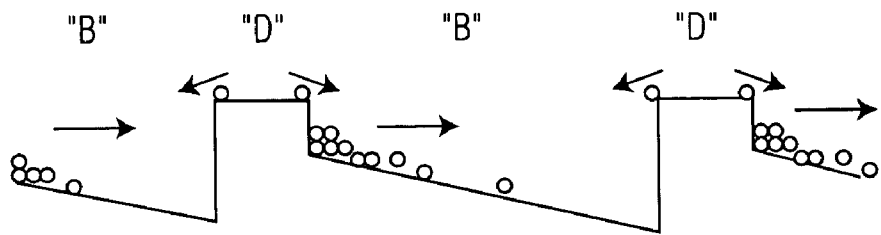

If a large number of particles need to be transported, the short-range digital mode is not efficient, because groups of particles are separated during transport. An analog mode utilizing an AC field gradient can function efficiently. As shown in FIGS. 23 and 24, the B-type region is a channel much longer than that present in digital mode. The AC field created in the B-type subchannel has a monotonically increasing magnitude. The magnitude at the high end is limited by some cutoff value that is predetermined not to affect the electrolyte and/or assays. At time 0, such subchannels are created and separated by D-type regions. The particles are then captured into the B-type subchannels and migrate to accumulate at one end. After a time interval, the channel structure shifts by half a subchannel length, then the accumulated particles will gather at a new end. This process repeats until all particles in the channel are transported to a designated end. By using only small separating gaps among subchannels, large and potentially detrimental AC potentials can be avoided.

In strong field gradient regions, the field-polarized particles can interact with the field gradient due to the interaction between inhomogeneous field distribution and their dipole moments. Such behavior is expected to be strong at the D/B interface and is characterized by a certain relaxation frequency, above which such force is negligible. If the D/B interface is created such that it moves towards a gathering region, only certain types of particles, which have a relaxation frequency greater than that of applied AC field, will be carried and collected within the moving boundary of D/B interface. Thus, the fractionation and sorting of particles can be accomplished.

Figure 25:
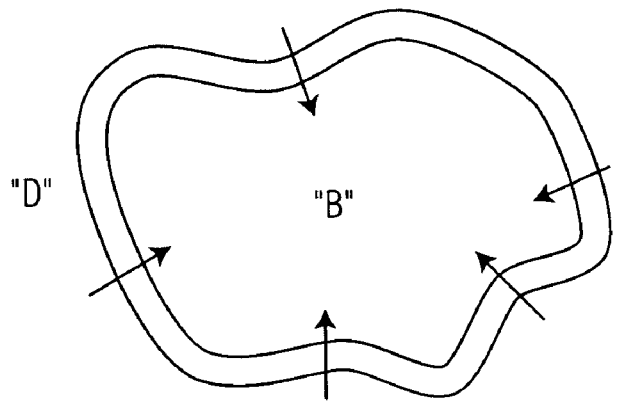
FIG. 25 is a plan view of a possible shape of a flow pattern

The shape of such interface may be arbitrary. See FIG. 25. At high frequencies, i.e., >100 KHz, particle fractionation and separation can be accomplished without participation of fluid flow. At low frequencies of about 1 KHz, the fractionation and separation can be coupled with and enhanced by the fluid flow across the moving boundary.

Figure 26A:
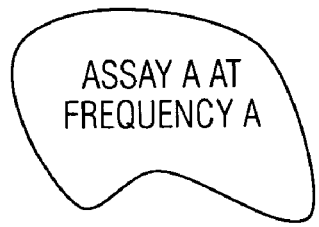
FIGS. 26A and 26B are plan views representing that assays can be conducted in different locations on the surface of a substrate.
Figure 26B:
Figure 27:
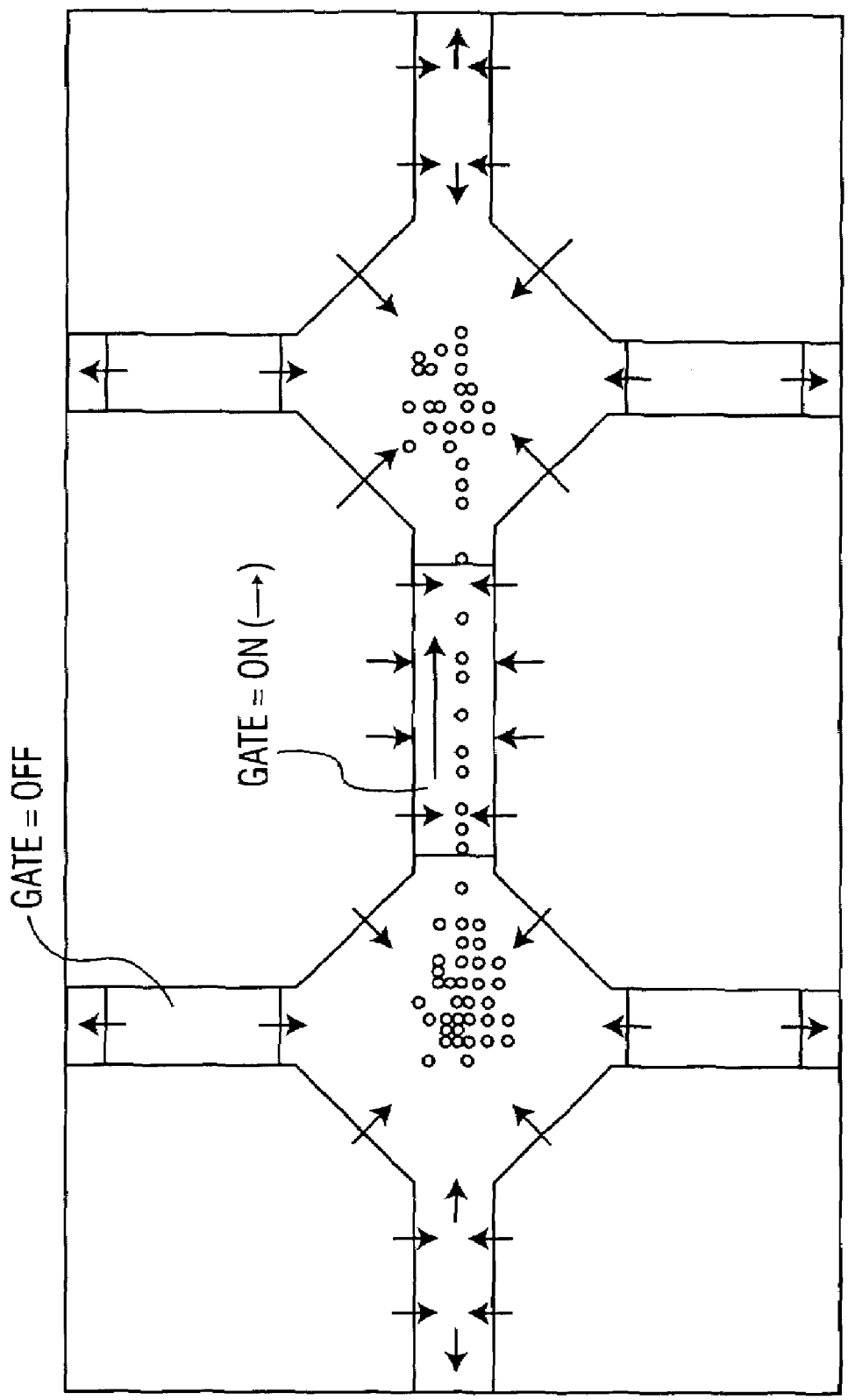
FIG. 27 depicts octagonal regions for collection of particles, where arrows denote the flow field near the surface, which shows that the particles carried in the fluid field tend to flow along the channels and to gather in the octagonal areas.

Because individual pixels and the frequency of each pixel can be controlled, the relaxation frequency sensitive sorting and assays can be conducted independently on different regions of the same electrode as illustrated in FIGS. 26A and 26B. The combination of such independent sorting operations permits assays to be conducted on the same surface in sequence or at the same time in different surface regions.

The electrode of the invention can also be used in a gated particle transport structure. Two effects, coating patterning (for particle confinement and collection) and gating, are combined in one step under electronic control. As shown in 27, the octagonal regions are collection areas for particles. The arrows denote the flow field near the surface, which shows that the particles carried in the fluid field tend to flow along the channels and to gather in the octagonal areas. The dark regions are applied with a "D"-type signal. The "gate" blocking the channel can be switched "on" by applying a configurable "B"-type signal but with a certain magnitude gradient along the channel. If the signal gradient is designed such that component of electrokinetic force along the channel on the one side of the gate vanishes, macroscopic flow will be established to transport particles from one gathering area to another—left to right in this particular case.

EXAMPLE 1

A Non-integrated Reconfigurable Electrode

To demonstrate the dynamic reconfigurability of the electrode structure, and to determine the optimal value of the separation between constituent pixels, a prototype was constructed to emulate certain features of the integrated device disclosed herein.

Figure 28:
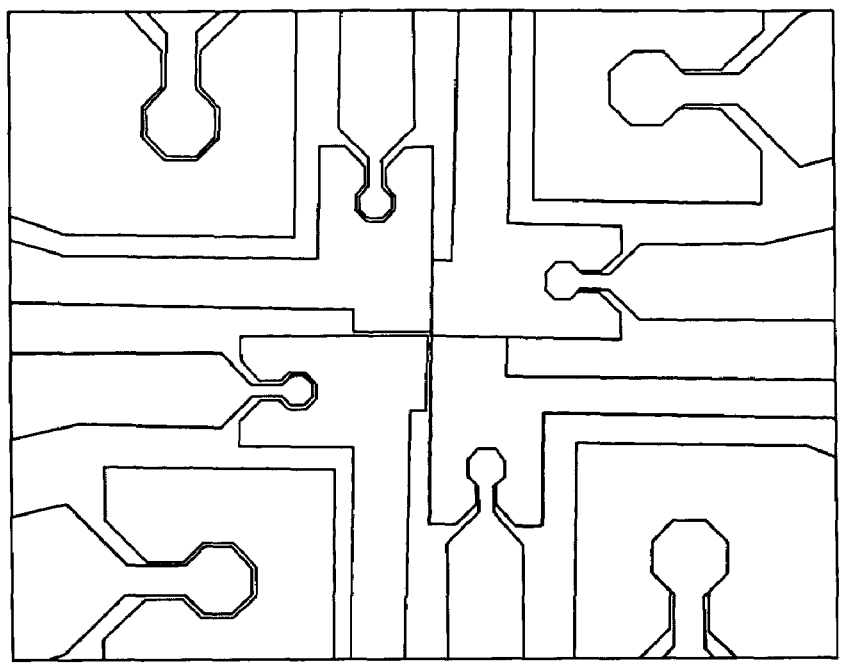
FIG. 28 depicts a plan view of a prototype array, with eight pairs of planar arrays.

Design Considerations—As illustrated in FIG. 28, the prototype comprises eight pairs of planar electrodes, each having a first electrode in the form of an octagonal core and a second electrode in the form of a ring that encloses the core; the width of the ring being 80 µm in the central region and 160 µm in the outer region. In each pair, the inner electrode represents a dynamic electrode formed by a group of contiguous pixels operated at the same voltage waveform, $V_1$, whereas the ring electrode represents a second dynamic electrode formed by a group of contiguous pixels surrounding the core electrode region, all operated at same voltage waveform, $V_2$. In each of the electrode pairs of the prototype, core and ring are separated by a planar gap and are electrically insulated from each other. In the electrode design shown in FIG. 28, respective values for the four inner electrode pairs were chosen to be 1, 2, 4, and 8 µm.

Figure 29:
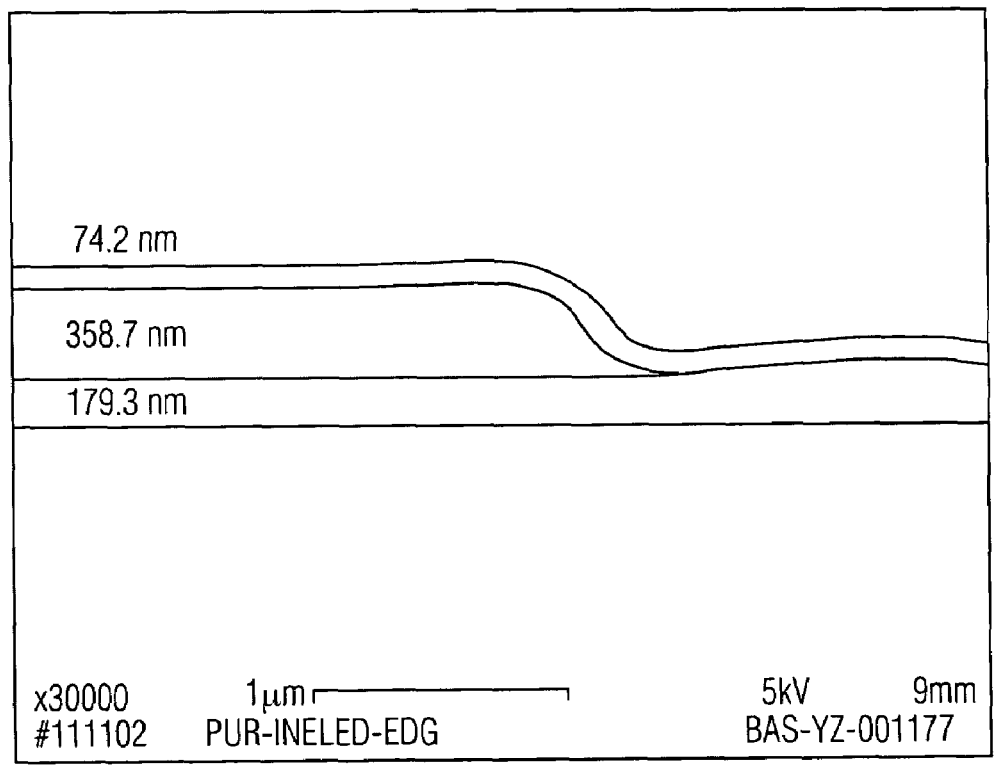
FIG. 29 is a cross-sectional view of the structure of the prototype of FIG. 28.

The multi-layer structure of the prototype, shown in cross-section in FIG. 29, consists of: a highly n-doped (0.001 Ohm.cm) silicon substrate; a silicon oxide dielectric layer of approximately 2000-A° thickness covering the entire substrate; a layer of tantalum of approximately 4000-A° thickness covering a portion of the substrate; and, a layer of tantalum pentoxide ($Ta_2O_5$) of approximately 700-nm thickness capping the tantalum layer. The layers of the multi-layer structure of the prototype shown in FIG. 29 respectively represent corresponding layers of the integrated device illustrated in FIG. 4. That is, the corresponding layers in FIG. 4 are, respectively: metal 2 ("sheilding"); dielectric 3; metal 3; high-∈ dielectric uppermost layer.

Tantalum pentoxide was selected as the preferred dielectric upper layer because it provides: (i) a high dielectric constant enabling, for a preset capacitance, the use of relatively thick and well insulating films, especially when the films are produced by anodization, as described below; (ii) effective anti-reflection properties, especially at the interface between silicon and aqueous solutions (such solutions are present in the bioanalytical assay applications of the invention); and, (iii) in contrast to semiconductor oxides, it is chemically stable in the presence of applied electric fields.

Anodization—To fabricate the electrode structure shown in FIG. 29, each electrode, produced by sputtering, was uniformly anodized in turn by placing a small Teflon ring, typically of a diameter of 5 mm, onto the central portion of the multi-electrode structure as shown in FIG. 28. The ring was overfilled with 8 microliters of 0.01% citric acid, so as to form a sessile drop, and the upper surface of the drop was contacted with a planar tantalum counter-electrode, whose area was large compared to that of the confining ring, in order to provide uniformity. The counter-electrode was separated from the test chip surface by a 400-micrometer gap formed by kapton spacers lying outside of the Teflon ring. To anodize a selected electrode, that electrode was connected by its respective pad to an external voltage or current source via a tungsten probe and the counter-electrode was grounded. In a given pass, only the selected electrode was anodized.

The procedure consisted of two steps. First, to grow an oxide film by anodization, a constant current was applied to attain a desired voltage and a corresponding desired oxide thickness. Next, to close remaining pin holes in the film, a constant voltage was applied. In this second step, oxide grows primarily to fill in pin holes until the current drops to a baseline value reflecting the insulating properties of the final film. To automate the process, a LabView (National Instruments, TX) program was written to apply constant voltage and/or current in accordance with a selected protocol and to record voltage and current in real time using a Keithley 2400 source meter (Keithley Instruments, NY).

Figure 30:
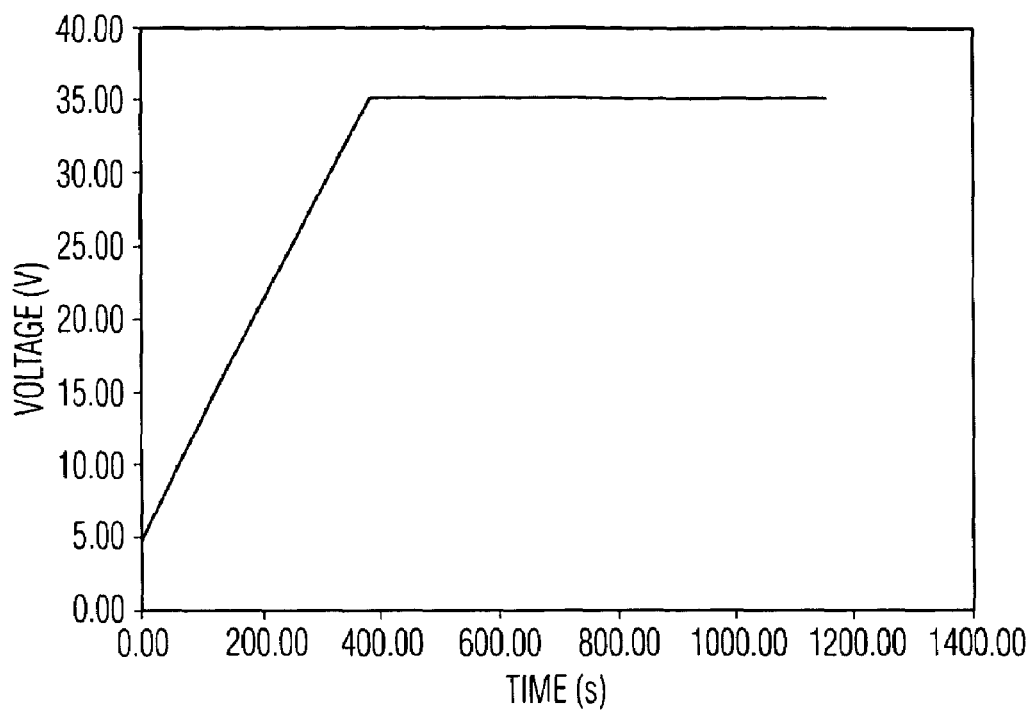
FIG. 30 shows a typical voltage and time relation in the anodization process for growth of a 600-A° $Ta_2O_5$ film on a core electrode.
Figure 31:
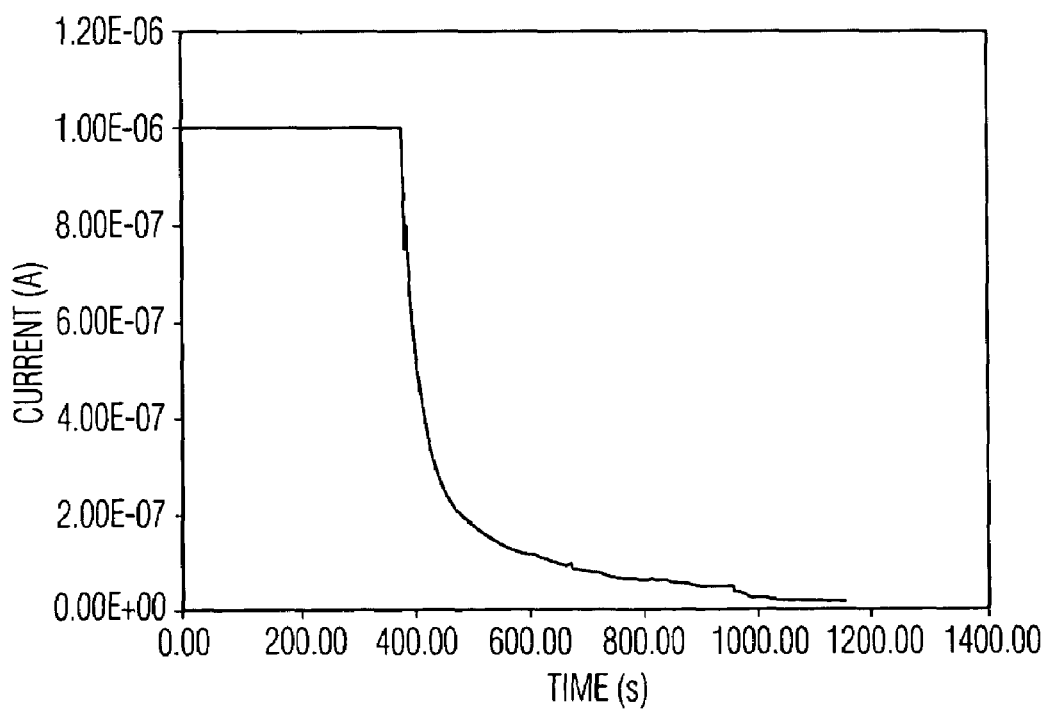
FIG. 31 shows a typical current and time relation in the anodization process for growth of a 600-A° $Ta_2O_5$ film on a core electrode.
Figure 32:
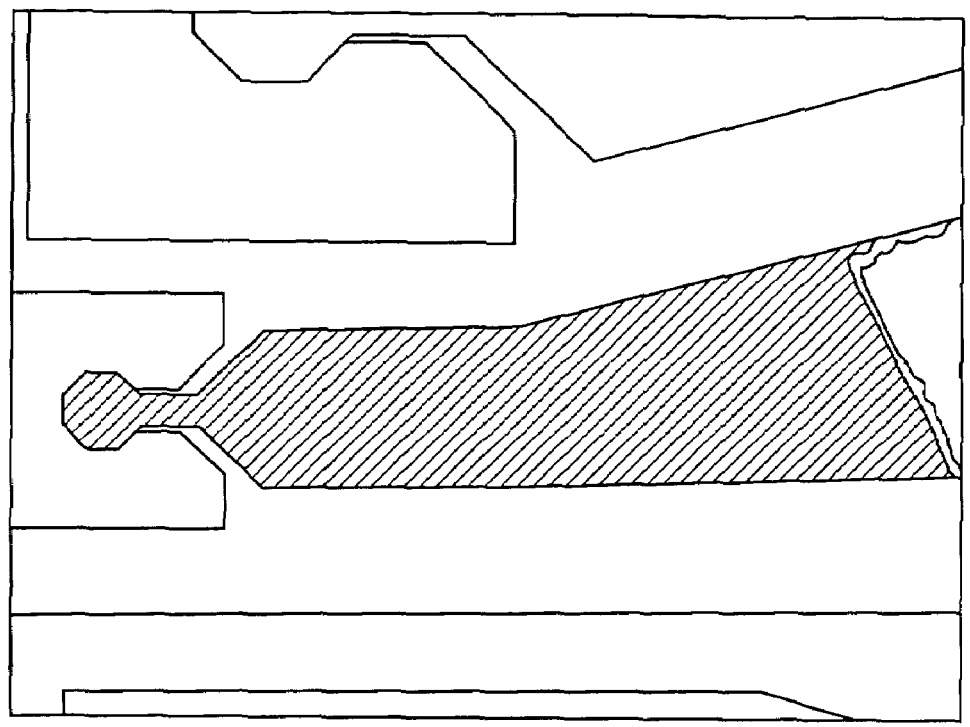
FIG. 32 is a plan view of an anodized core electrode.

FIGS. 30 and 31 show a typical voltage and current time relation in the anodization process for growth of a 600-A° $Ta_2O_5$ film on the core electrode, having a 1-μm-gap core-ring pair, as shown in FIG. 28. FIG. 31 shows the constant current characteristic of the first step and the exponential decay of the leakage current of the second step as pin holes are filled in. A plan view of the anodized core electrode is depicted in FIG. 32.

Electrical Characteristics: Impedance—To demonstrate the performance of the prototype device—notably the desired capacitive coupling between adjacent electrodes ("pixels") via the intervening polarizable liquid medium—an impedance analysis was performed using: an analog lock-in amplifier (Stanford Research 530A), a DSP dual channel lock-in amplifier (Stanford Research SR 830), a function generator (HP 3312A), and a source meter (Keithley 2400). A LabView program (LabView VI, National Instruments, TX) was designed to control the configuration and automate the sequence of setting frequency and recording instrument readings. To scan frequency—typically over a range from 10 Hz to 10 kHz —a series of values of frequency were selected and produced in turn by applying the corresponding voltage to the voltage-controlled-oscillator of the HP 3312A. For each value of the frequency, the resulting magnitude and phase of AC current and voltage were simultaneously recorded by the SR 830 and SR 530, respectively.

Figure 33:
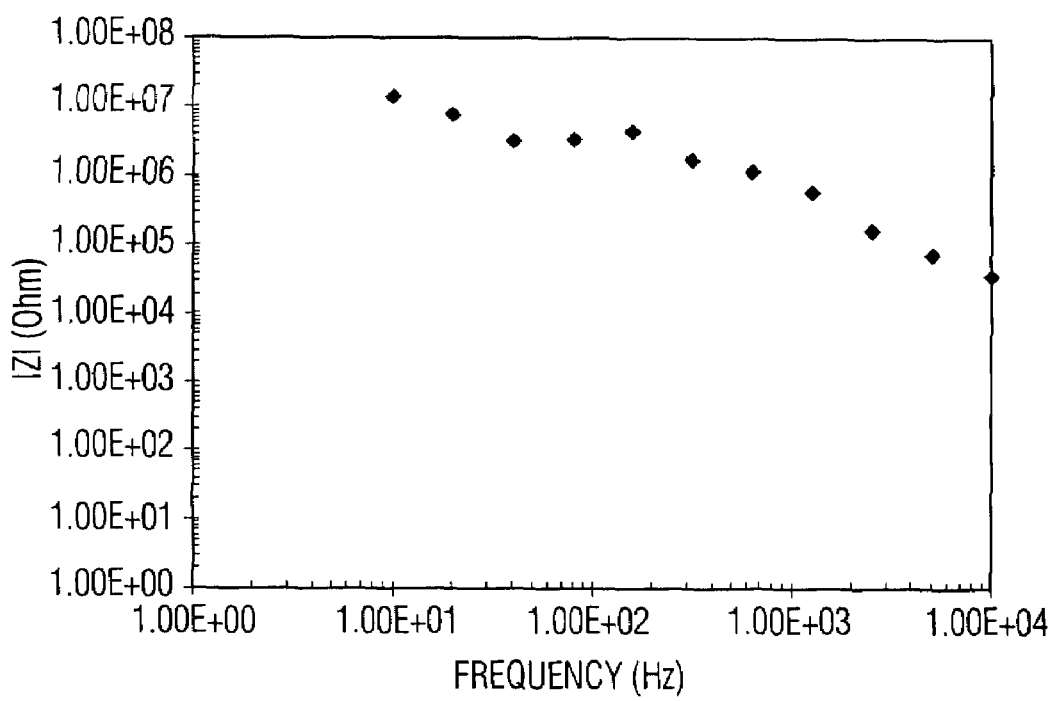
FIG. 33 is a plot of the Magnitude (|Z|) of the impedance, Z, computed from the current and voltage signals recorded for the 1-µm core-ring electrode of the prototype structure of FIG. 28.
Figure 34:
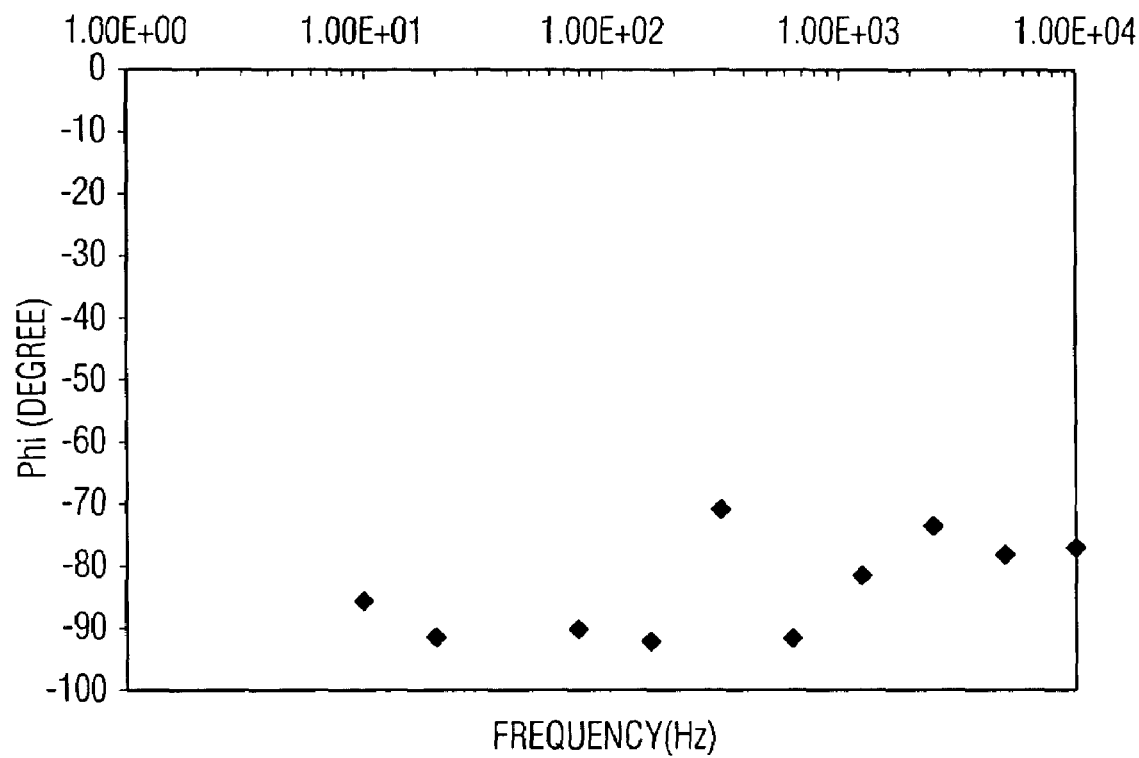
FIG. 34 is a plot of the Phase ($\phi$) of the impedance, Z, computed from the current and voltage signals recorded for the 1-µm core-ring electrode of the prototype structure of FIG. 28.

Magnitude (|Z|) and Phase (φ) of the impedance, Z, computed from the current and voltage signals recorded for the 1 -μm core-ring electrode of the prototype structure of FIG. 28, are respectively displayed in FIGS. 33 and 34 as a function of frequency. These profiles indicate the desired capacitive coupling.

EXAMPLE 2

Simulation of Electrolyte-insulator-metal Interface

Introduced here is a practical approach to numerical device simulation—currently not available—for electrolyte-insulator-conductor heterostructures. In accordance with this method, a 1:1 electrolyte (a solution containing two types of mobile ionic species of equal and opposite charge) is modeled as a semiconductor of low mobility where the generation and recombination activities of carriers are zero. This simulates the electrical properties of a reconfigurable electrode of the invention; specifically, the distribution of ion concentration, ionic current, and electric potential and fields near the interface, in the presence of lateral spatial modulations. The same simulation method can also be applied to simulate an electrolyte-insulator-semiconductor structure, with use of an appropriate solver.

Using the Luminous and S-PISCES modules in an ATLAS simulator (from Silvaco, Mass.), a simulation was performed to compute the current distribution produced in response to a voltage ramp at the interface between a dielectric film and an electrolyte (modeled as a low mobility semiconductor) in the region of the lateral gap between two electrodes, where each electrode represents pixels or contiguous groups of pixels operating at the same voltage. The electrodes are modeled to be embedded in the dielectric film and to be operating at different voltages.

The following conditions and parameters were used:
Temperature of 300° K.
Same electron affinity and bandgap as Si @ 300° K.
Intrinsic material. By assuming the validity of the Boltzmann distribution, the pseudo band structure can be introduced with identical values of the density states of valence and conduction bands, which are set to match the correct ion density in the electrically neutral electrolyte bulk. For example, for 0.26 mM Tris, Nc and Nv are $1.842 \times 10^{26}$ $cm^{-3}$ @ 300° K.
Bulk mobilities replaced by ion mobilities (a factor of $10^{-4}$, which is an order of magnitude smaller than those of electron and hole carriers in a semiconductor); specifically, to model tris-acetate, published values of ion mobilities were used: Tris+1=$3.0476 \times 10^{-4} cm^2 s^{-1} V^{-1}$, Acetate –1=$4.236 \times 10^{-4} cm^2 s^{-1} V^{-1}$.)
Dielectric constant of 80—same as water.
Zero photogeneration.
Infinite recombination lifetime (in this case, was assumed to be 1 s, which is long compared to the 0.25 -ms duration of ramps).
Zero recombination velocities at interface.
A pseudo 10-A° $SiO_2$ is inserted at all interfaces with electrolyte with tunneling option OFF (to cut off carrier or ion exchange between electrolyte and semiconductor). Only the electrical field is allowed to permeate.

If fluid flow needs to be taken into account, zero ion mobilities at the interface or no-slip flow boundary conditions should be assumed. Also, an extra convection term needs to be included in the ionic current expression to indicate the reality of ionic flow in the bulk medium and interfacial layer. However, in this simulation these additional conditions were neglected for simplicity.

Figure 35:
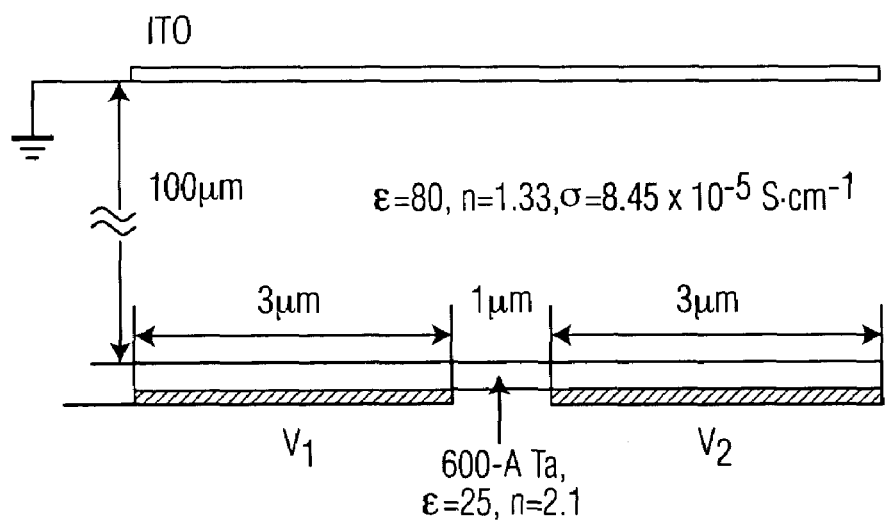
FIG. 35 shows a structure for a simulation of the microelectrode of the invention, composed of a conductive ITO electrode, a bulk electrolyte, and a pair of metal electrodes separated by a lateral gap of 1 µm and embedded in a $Ta_2O_5$ film of 600-Angstrom thickness.
Figure 36A:
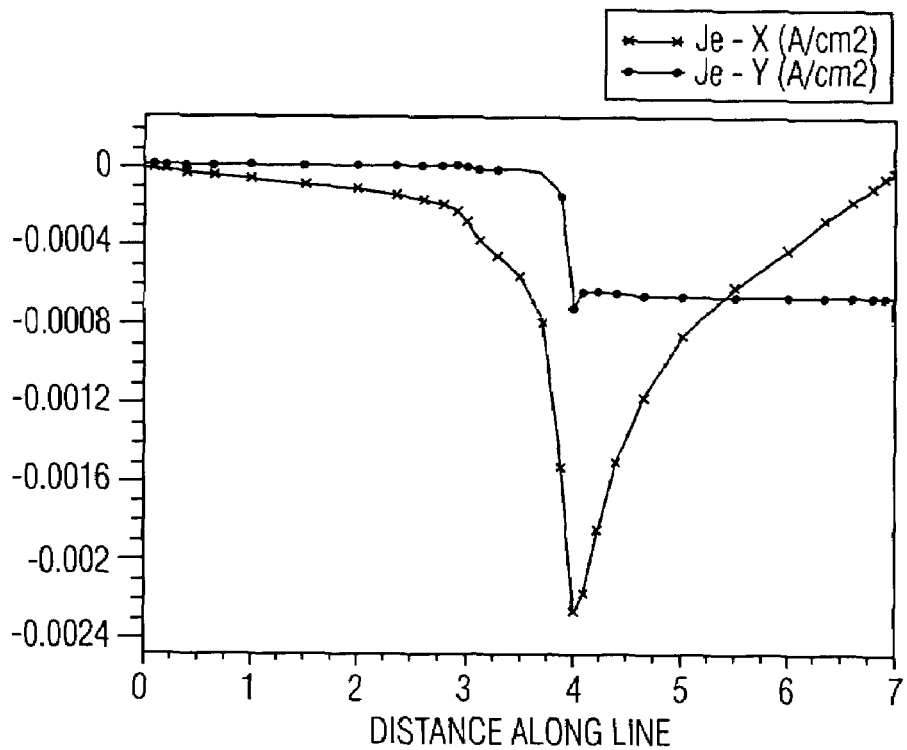
FIGS. 36A-D show linear profiles of the current distribution along the x and y-directions above the $Ta_2O_5$ layer (where one is in the semiconductor ("electrolyte") interface) in response to a positive voltage ramp.
Figure 36B:
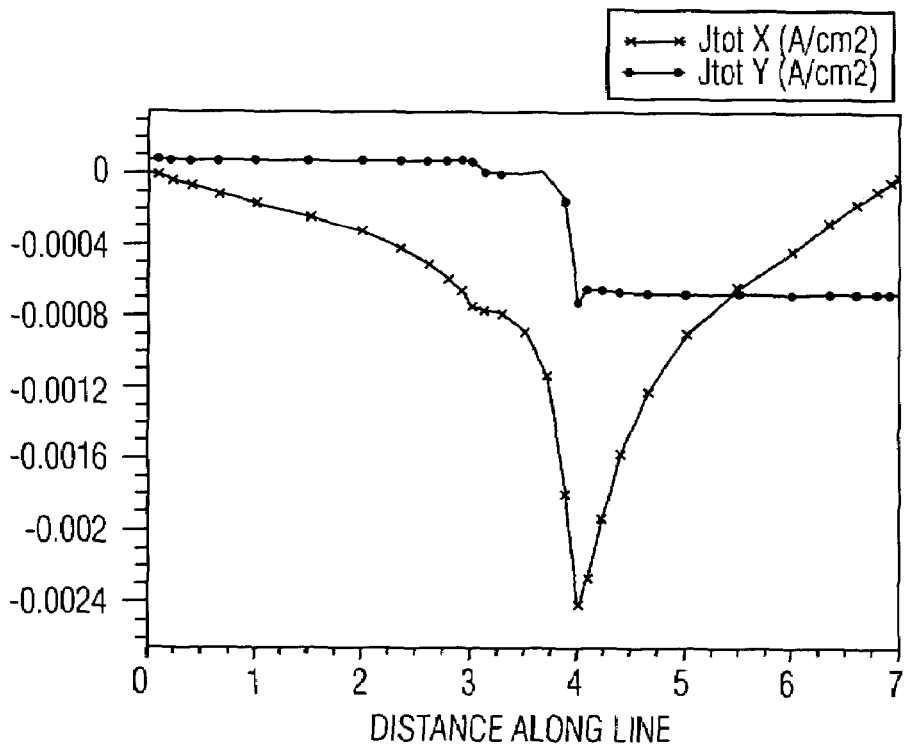
Figure 36C:
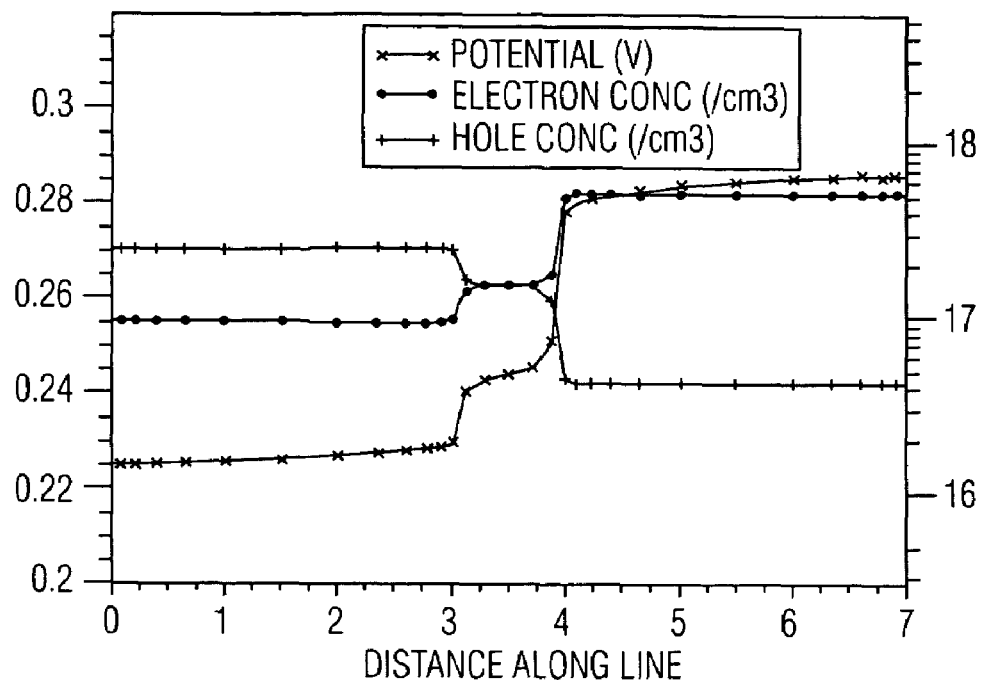
Figure 36D:
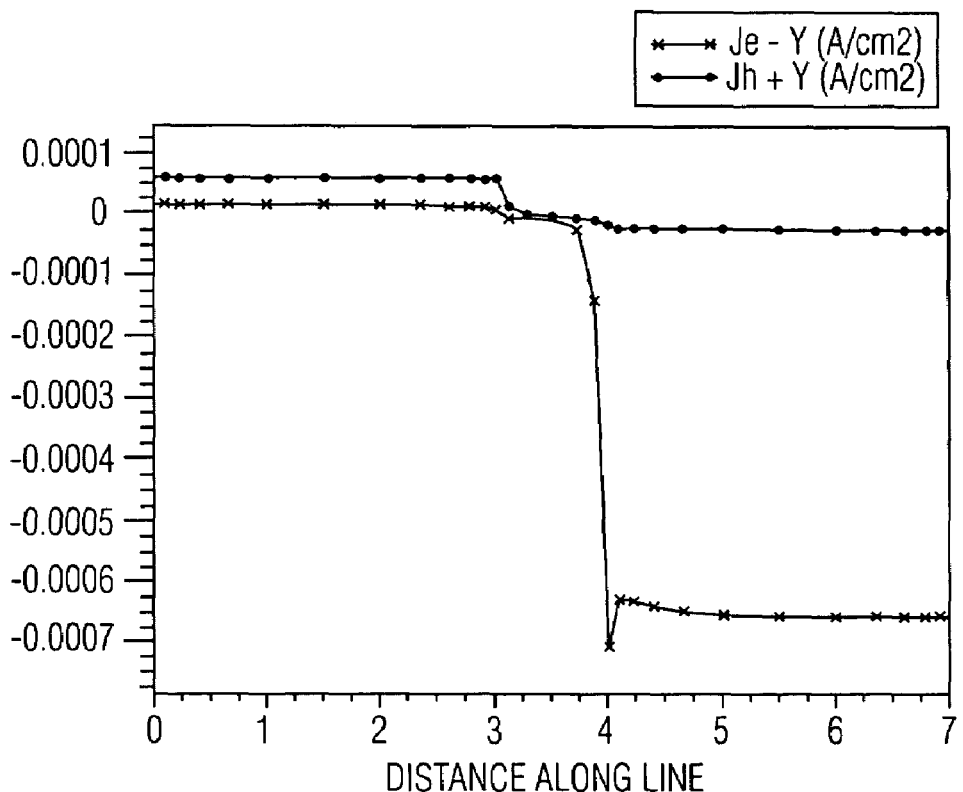
Figure 37A:
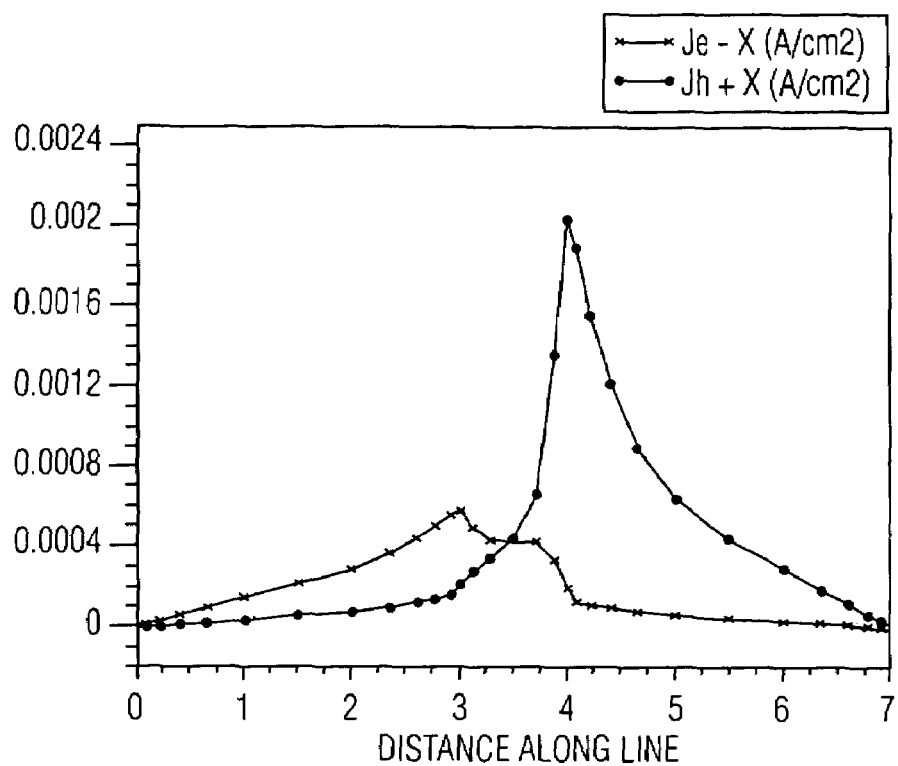
FIGS. 37A-D show linear profiles of the current distribution along the x and y-directions above the $Ta_2O_5$ layer in response to a negative ramp.
Figure 37B:
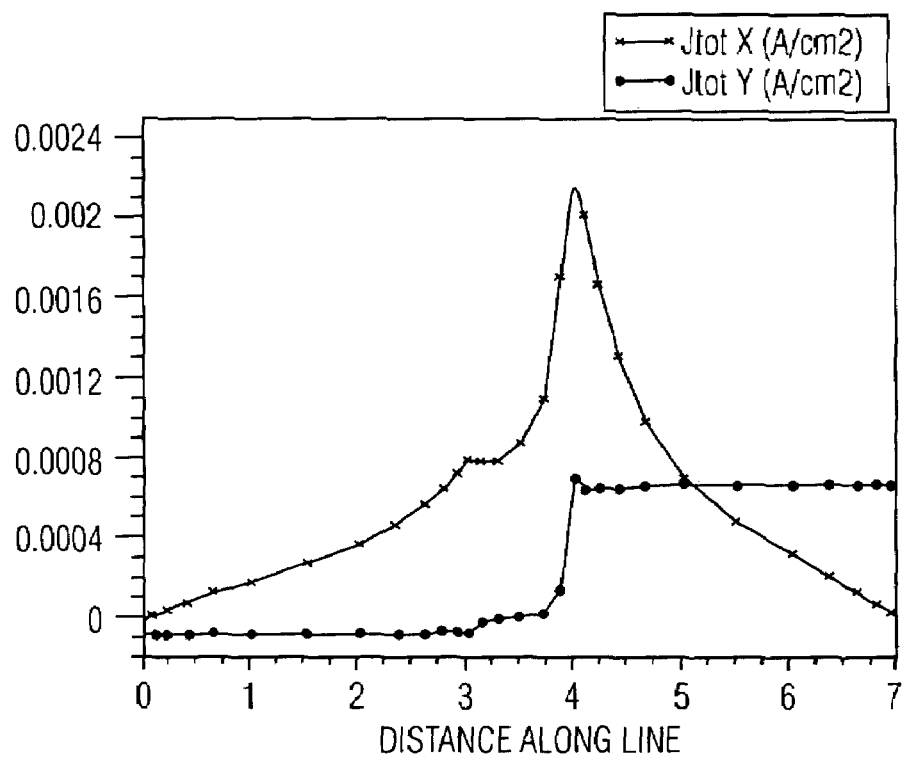
Figure 37C:
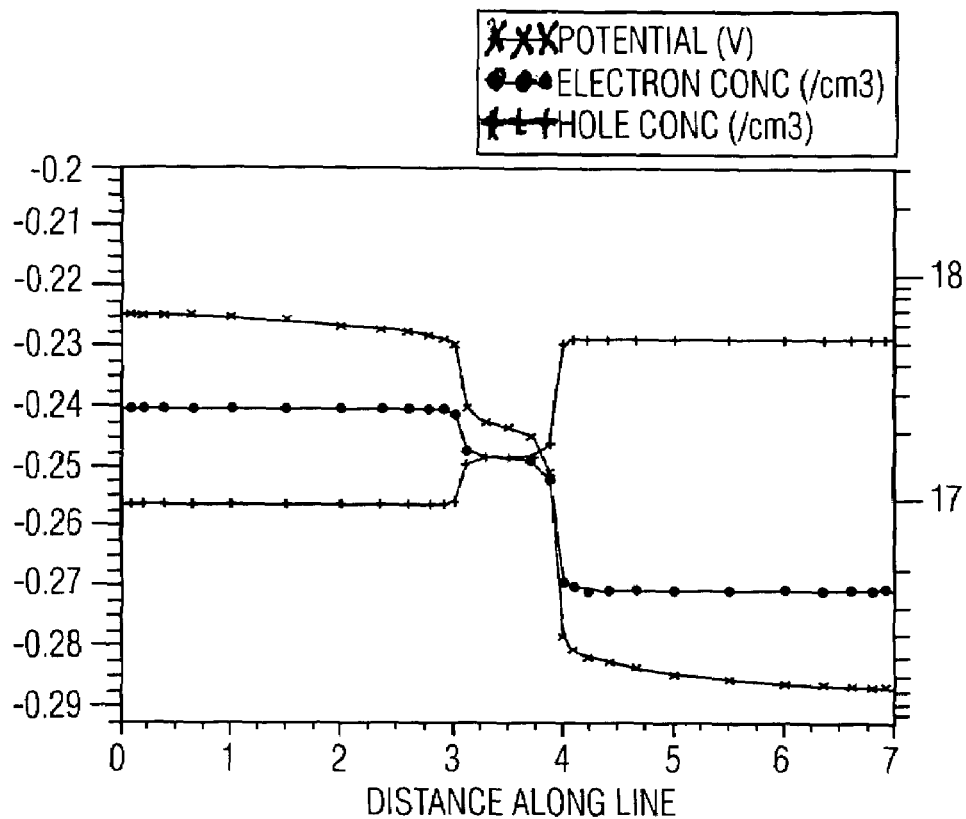
Figure 37D:
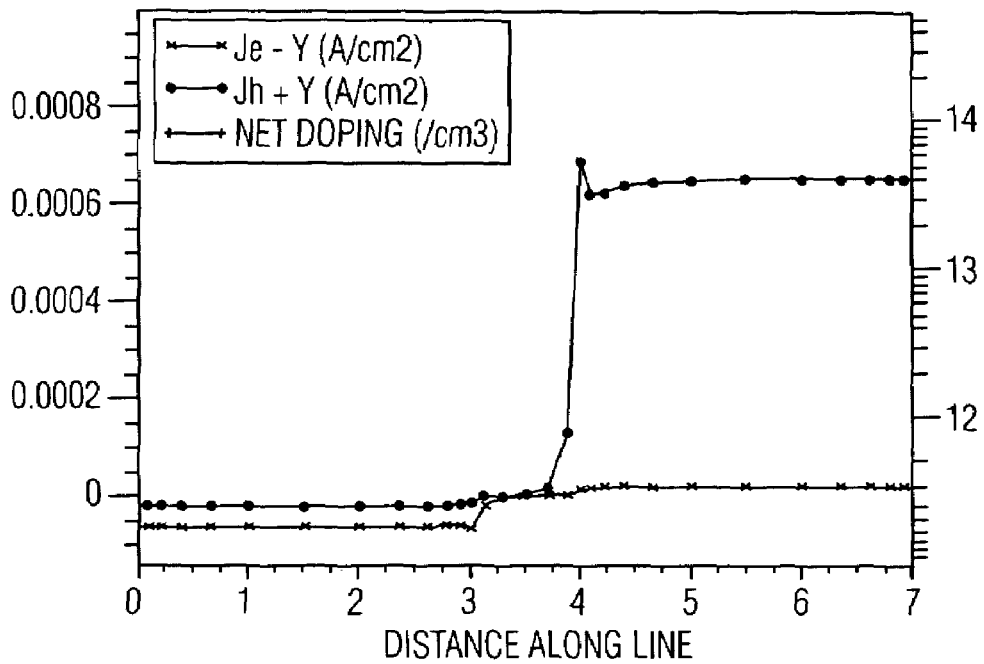

The sandwich structure for this simulation was composed of a conductive ITO electrode, a bulk electrolyte, and a pair of metal electrodes separated by a lateral gap of 1 μm and embedded in a $Ta_2O_5$ film of 600-Angstrom thickness. See FIG. 35. The ITO and one of the embedded metal electrodes, V1 were connected to a common ground (V=0). The other embedded metal electrode V2 was connected to a voltage source. To model the effects of an applied AC voltage, the response to two linear ramps was computed, namely:
a positive linear ramp from V=0 to V=+1V in 0.25 ms; and
a negative linear ramp from V=0 to V=−1V in 0.25 ms.

Linear profiles of the current distribution along the x and y-directions at an elevation of 100 Angstroms above the $Ta_2O_5$ layer (at which elevation one is in the semiconductor ("electrolyte") interface) as shown in the four panels of FIG. 36A-D, reveal that at the end of the positive ramp, an excess of negatively charged ions accumulated in the electrolyte near the electrolyte-insulator interface above the active electrode, while a slight excess of positively charged ions accumulated near the electrolyte-insulator interface above the grounded electrode, due to the fact that the potential in the bulk of the electrolyte is slightly elevated. The total ionic current is directed primarily along the interface—in a direction away from the active electrode—and is composed primarily of negatively charged ions. That is, in response to the positive ramp, there is net ion transport from the grounded electrode to the active electrode. Conversely, as shown in FIG. 37A-D, in response to the negative ramp, the current and the predominant positive ionic species also flows from the grounded to the active electrode.

This simulation supports the conclusion that the transverse ionic current—and the anticipated coupled electrokinetic fluid flow—set up in the electrolyte adjacent to the dynamically configurable electrode in response to applying differential AC voltages to adjacent pixels, will be directed toward regions of stronger voltage potentials, in both positive and negative cycles of the waveform. That is, lateral ionic flows are rectified.

EXAMPLE 3

Array Formation and Programmable Array Reconfigurable Using a Dynamically Reconfigurable Electrode To demonstrate the reconfigurability of the electrode of Example 1 in controlling the transport and assembly of microparticles at the interface between the electrode and a polarizable liquid medium, the device was used to generate planar arrays of particles in two distinct configurations. A suspension of particles was formed by placing oligo (dT) 25 microparticles ("Dynabeads, Dynal Biotech, Oslo) in a solution of 0.26 mM Tris with 0.01% Triton in 18-MΩ water. The particle density of the suspension was adjusted so as to produce a layer of settled particles on the electrode corresponding to less than complete monolayer coverage. An aliquot of the suspension was placed onto the reconfigurable electrode of Example 1 and was contacted by an ITO-coated glass cover-slip so as to form a "sandwich" configuration, typically accommodating 0.5 μl of suspension in a 100 μm gap. The gap was defined by a pair of kapton spacers. Using a translation stage, one of the 1 um core-ring electrodes of the structure was placed in the viewing field of a stereo microscope (Bausch & Laumb), to permit real-time observation, using a long-working distance 10× objective.

Figure 38:
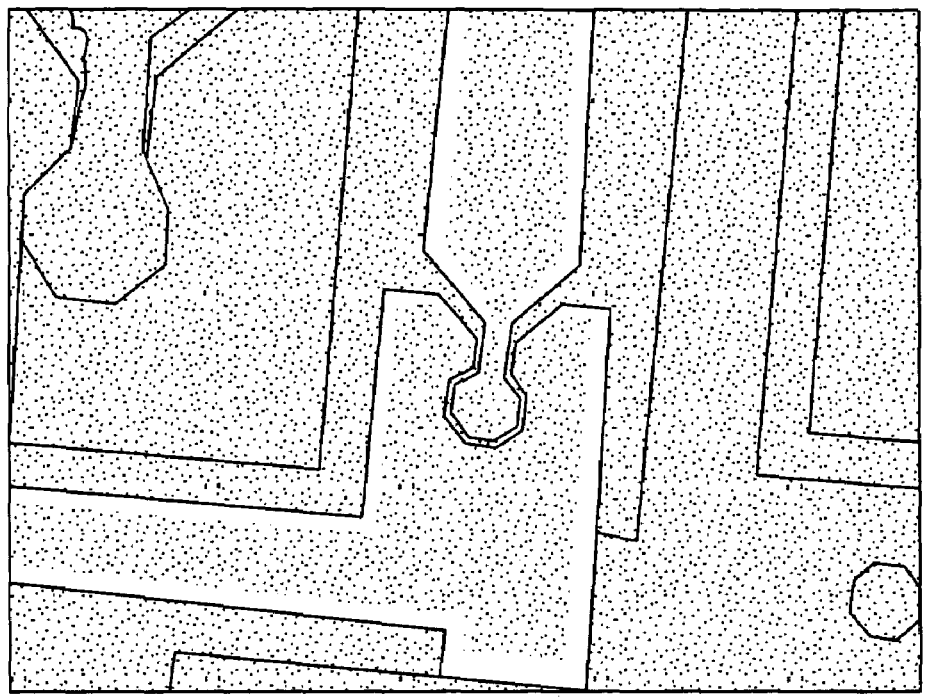
FIG. 38 illustrates that particles were collected with equal efficiency by both core and ring electrodes.

When the same AC voltage of typically 2 Vpp, 0.5 kHz, was applied between the core and the (grounded) ITO counter-electrode, V(Core), and between the ring and the counterelectrode, V(Ring), particles were collected from the areas of the substrate surrounding the electrodes. FIG. 38 illustrates that particles were collected with equal efficiency by both core and ring electrodes ("B type" regions in FIG. 38) from the surrounding areas ("D type" regions in FIG. 38). A depletion zone—clearly visible in FIG. 38—was formed along the interior of the entire core-ring electrode circumference but not between core and ring, indicating that—under the condition V(Core)=v(Ring)—core and ring were acting in tandem without generating differential displacement of particles between core and ring.

Figure 39:
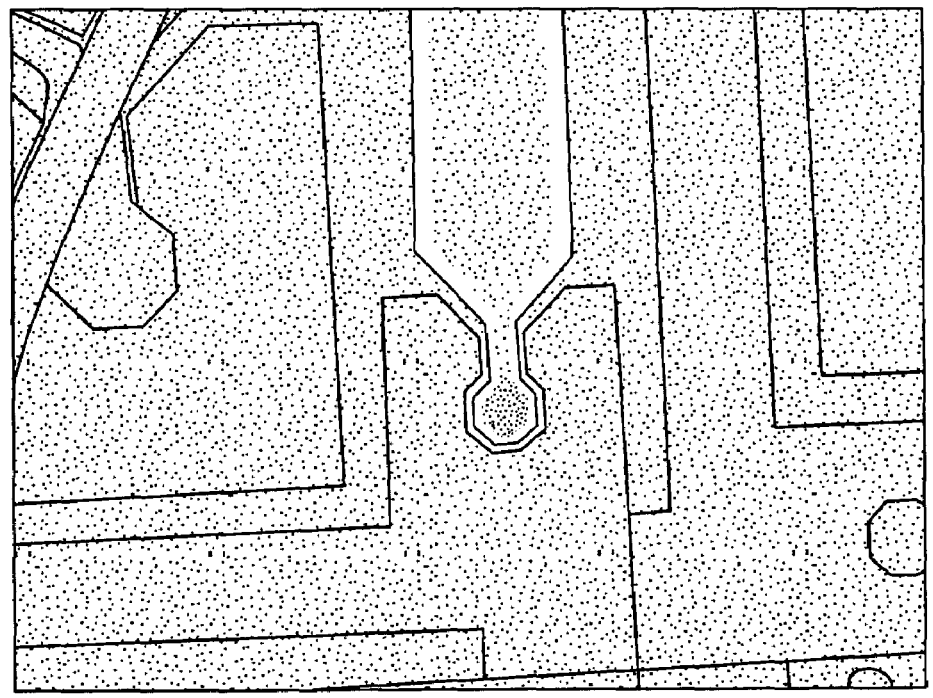
FIG. 39 illustrates that under the condition V(Core)>V (Ring), particles migrated from the ring to the core electrodes.

In contrast, as shown in FIG. 39, under the condition V(Core)>V(Ring), particles were observed to migrate from the ring to the core. Setting V(Core)<V(Ring) inverts the direction of transport (not shown). A depletion zone was formed along the circumference of the core electrode where none was visible before, indicating differential displacement of particles from the region of lower-voltage to that of higher-voltage waveform signal. That is, the device permitted the desired electronically programmable array reconfiguration, in this instance involving the segmentation of the initial array into two arrays.

The example depicted in FIGS. 38 and 39 illustrate a configuration when the boundary of the core and ring is fixed, and particles are accumulated. In a case when the boundary is reconfigurable and mobile, in addition to accumulation, the segmentation and transport of particles can be achieved.

EXAMPLE 4

Flow Programming: Flow Control Elements

As with conventional electroosmotic flow, the rectified lateral current directed from electrode regions of lower-voltage waveform to electrode regions of higher-voltage waveform induces electrokinetic transport in the direction of the local current. Using the prototype design of Example 1, fluid flow was generated in the vicinity of the electrode in a direction parallel to the electrode surface and normal to the contour delineating groups of contiguous pixels, which act in concert by virtue of being connected to identical voltages.

As explained in Example 2 for particle transport, flow fields were reconfigured, for example, by first defining, for the condition V(Core)=V(Ring), the relevant flow-defining contour to be that delineating the exterior contour of the "paired" core and ring structure. Under the condition V(Core)> V(Ring), flow was generated, in addition to the flow normal to the exterior contour, in the direction normal to the interior contours separating core and ring structures and into the core. Setting V(Core)<V(Ring) inverts the direction of flow. Counter-propagating flows originating, for example, from opposite portions of parallel contour, produce upflow in the center of the electrode structure. See FIGS. 38 and 39.

EXAMPLE 5

Fractionation and Analysis of Particles and Cells

Particles differing in size, chemical surface properties and/or electrical properties such as polarizibility or, in the case of vesicles or cells,.differing in transmembrane membrane conductance, can be separated based on their respective dielectric relaxation frequencies. Under conditions as described in Example 3, such particles and cells can be fractionated using the devices and method of the present invention, in analogy to the methods described in allowed U.S. patent application Ser. No. 09/813,571 (analogous to International Patent Application Publication WO 02/076585 entitled "ANALYSIS AND FRACTIONATION OF PARTICLES NEAR SURFACES").

Particles in a suspension containing polymer ("latex") microparticles of two different sizes, each typically in the range from 1-10 microns, in an aqueous solution of 0.25 mM Tris with 0.01% Triton, when placed on an electrode of the design of Example 1, may be fractionated into homogeneous subpopulations by selectively collecting, under conditions similar to those in Example 2, only one of the subpopulations into the designated region of the electrode to which the highest voltage is applied. Specifically, given relaxation frequencies $\omega_R^{(1)}$ and $\omega_R^{(2)} > \omega_R^{(1)}$ for particle populations (1) and (2), particle fractionation is accomplished by selectively collecting particle population (1) into the designated area of the electrode by setting the frequency, $\omega$, of the applied voltage such that $\omega_R^{(2)} > \omega > \omega_R^{(1)}$.

EXAMPLE 6

Integrated On-chip Cellular Analysis

Figure 40:
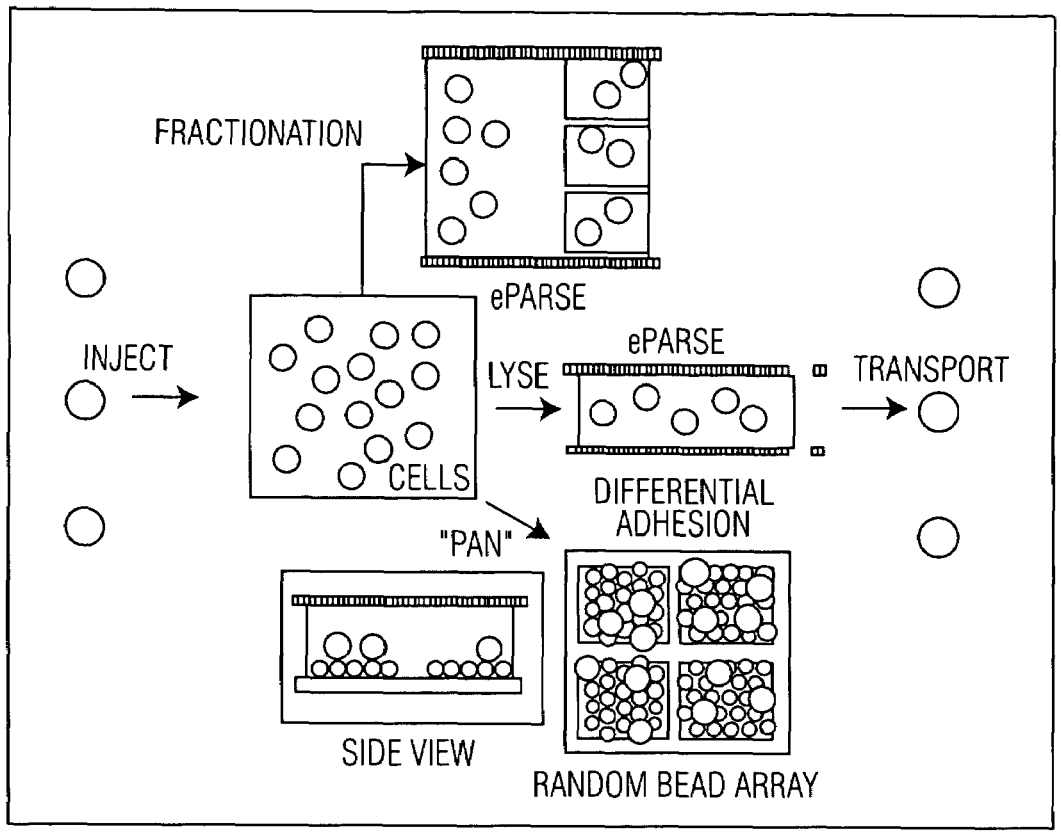
FIG. 40 demonstrates sets of fundamental operations which may be integrated to perform complex operations in array cytometry.

By concatenating sets of fundamental operations such as directed translation, collection/array formation and holding, as well a fractionation and sorting step (as in Example 5), complex operations may be performed, sequentially and concurrently in multiple designated portions of a dynamically reconfigurable electrode. This allows one to realize an integrated format of array cytometry analogous to the methods and designs disclosed in U.S. Pat. No. 6,387,707, entitled ARRAY CYTOMETRY (and incorporated herein by reference). See FIG. 40 below.

It should be understood that the examples and discussion above are exemplary only, and not limiting, and that the scope of the invention is defined only in the claims which follow, and includes all equivalents of the subject matter of the claims.

What is claimed is:

1. A dynamically configurable electrode comprising:
a shielding layer located in a first region;
a planar array of pixels in a second region such that the shielding layer isolates the planar array of pixels from a driving circuit on the side of the shielding layer opposite from the planar array of pixels, said planar array of pixels having an insulating layer thereon, said pixels individually addressable by a time-varying waveform voltage and, adjacent pixels receiving, at any instant in time, either the same voltage waveform or a different voltage waveform such that said planar array of pixels, upon receiving different voltage waveforms, forms a means for initiating recirculation of a polarizable liquid medium and movement of dipolar entities parallel to the planar array and towards one or more regions adjacent said planar array of pixels, wherein the double-layer capacitance at the polarizable liquid medium-pixel interface is smaller than the capacitance of the insulating layer, but is far greater than the stray capacitance between the planar array of pixels and the shielding layer, and
wherein the dipolar entities reside in the polarizable liquid medium and can include dipolar molecules, ions, cells or polarized particles;
wherein said polarizable liquid medium resides adjacent said insulating layer and between a planar electrode, lying parallel to the planar array of pixels and located in a third region, and
wherein the planar electrode provides a reference voltage to the polarizable liquid medium.

2. The electrode of claim 1 wherein, in general, the dipolar entities which are nearer to the interface of the insulator and the polarizable liquid medium move to a greater extent than the dipolar entities which are further from the interface.

3. The electrode of claim 1 wherein the planar array is divided into pixel regions, and contiguous pixels within a region can receive the same voltage waveform at a given time.

4. The electrode of claim 1 wherein the relative magnitude of the waveforms determines the direction of motion of the polarizable medium.

5. The electrode of claim 1 wherein the planar electrode provides a reference voltage to the planar array of pixels of a magnitude such that dipolar entities in the medium are forced adjacent to the planar array surface.

6. A programmable dynamically configurable substantially planar electrode for generating recirculation of polarizable liquid medium and movement of dipolar entities, including dipolar molecules, ions, cells and particles, in a polarizable medium, parallel to the planar electrode, comprising: a shielding layer; a planar array of pixels in a different plane from the shielding layer such that the shielding layer isolates the planar array of pixels from a driving circuit on the side of the shielding layer opposite from the planar array of pixels, said planar array of pixels having an insulating layer thereon, said pixels individually addressable by a time-varying waveform voltage and, adjacent pixels receiving, at any instant in time, either the same voltage waveform or a different voltage waveform such that said planar array of pixels, upon receiving different voltage waveforms, forms a means for initiating movement of dipolar entities parallel to the planar array and towards one or more regions adjacent said planar array of pixels, wherein the double-layer capacitance at the polarizable liquid medium-pixel interface is smaller than the capacitance of the insulating layer, but is far greater than the stray capacitance between the planar array of pixels and the shielding layer, the polarizable liquid medium being suspended between a second planar electrode, lying parallel to the array of pixels, and the pixels and wherein the second planar electrode provides a reference voltage to the polarizable liquid medium; and a computer and user interface for controlling the addressing of and the voltage waveforms received by the pixels.

7. The planar electrode of claim 6 wherein the planar array of pixels is divided into pixel regions, and contiguous pixels within a region can receive the same voltage waveform at a given time, and a user can control region contours to form any of a variety of flow patterns on the planar electrode.

8. The planar electrode of claim 6 wherein, in general, the dipolar entities which are nearer to the interface of the insulator and the polarizable liquid medium move to a greater extent than the dipolar entities which are further from the interface.

9. The planar electrode of claim 6 wherein the relative magnitude of the waveforms determines the direction of motion of the polarizable medium.

10. The planar electrode of claim 6 wherein the second planar electrode provides a reference voltage to the planar array of a magnitude such that dipolar entities in the medium are forced adjacent to the planar array surface.

11. The dynamically configurable electrode of claims 1 or 6 wherein the voltage waveforms have a frequency of less than 1 kHz.

* * * * *